United States Patent
Chang et al.

(10) Patent No.: US 9,848,094 B2
(45) Date of Patent: Dec. 19, 2017

(54) MOBILE SCANNER VIA PRIVATE DATA ON CLOUD

(71) Applicants: Donald C. D. Chang, Thousand Oaks, CA (US); Juo-Yu Lee, Camarillo, CA (US); Steve K. Chen, Pacific Palisades, CA (US)

(72) Inventors: Donald C. D. Chang, Thousand Oaks, CA (US); Juo-Yu Lee, Camarillo, CA (US); Steve K. Chen, Pacific Palisades, CA (US)

(73) Assignee: Spatial Digital Systems, Inc., Agoura Hills, CA (US)

( * ) Notice: Subject to any disclaimer, the term of this patent is extended or adjusted under 35 U.S.C. 154(b) by 0 days.

(21) Appl. No.: 14/935,319

(22) Filed: Nov. 6, 2015

(65) Prior Publication Data
US 2017/0078501 A1     Mar. 16, 2017

Related U.S. Application Data

(60) Provisional application No. 62/216,402, filed on Sep. 10, 2015.

(51) Int. Cl.
*H04N 1/00*      (2006.01)
*H04L 29/08*     (2006.01)
*G06F 3/12*      (2006.01)

(52) U.S. Cl.
CPC ....... *H04N 1/00307* (2013.01); *G06F 3/1222* (2013.01); *G06F 3/1248* (2013.01); *G06F 3/1292* (2013.01); *H04L 67/10* (2013.01); *H04N 1/00108* (2013.01)

(58) Field of Classification Search
CPC .................................................. H04N 1/00307
See application file for complete search history.

(56) References Cited

U.S. PATENT DOCUMENTS

| | | | |
|---|---|---|---|
| 8,098,612 B2 | 1/2012 | Chang | |
| 8,111,646 B1 | 2/2012 | Chang | |
| 2010/0332401 A1* | 12/2010 | Prahlad | G06F 17/302 705/80 |
| 2011/0197740 A1 | 8/2011 | Chang | |
| 2012/0259561 A1* | 10/2012 | Hoh | G06K 9/624 702/57 |
| 2012/0319885 A1* | 12/2012 | Chang | H03F 1/0277 341/155 |
| 2013/0333544 A1 | 12/2013 | Chang | |
| 2014/0081989 A1 | 3/2014 | Chang | |
| 2015/0193735 A1* | 7/2015 | Lavrov | G06Q 10/10 705/342 |
| 2015/0248431 A1 | 9/2015 | Lee | |

* cited by examiner

*Primary Examiner* — Ibrahim Siddo

(57) ABSTRACT

Presented are cloud storage architectures for private data of scanned documents uploaded from smart phone among terminals with enhanced capability of data privacy and survivability. Pre-processing for storing data in IP cloud comprises: transforming multiple first data sets into multiple second data sets at an uploading site, wherein one of said second data sets comprises a weighted sum of said first data sets; storing said second data sets in an IP cloud via IP connectivity; and storing data in multiple data storages linking to said second data sets at said uploading site. In accordance with an embodiment of present invention post processing may comprise recovering said second data sets at a downloading site via IP network.

20 Claims, 30 Drawing Sheets

K-Muxing/Demuxing in remote accessing
*Data in distributed cloud storage with a 3 for 4 redundancy*

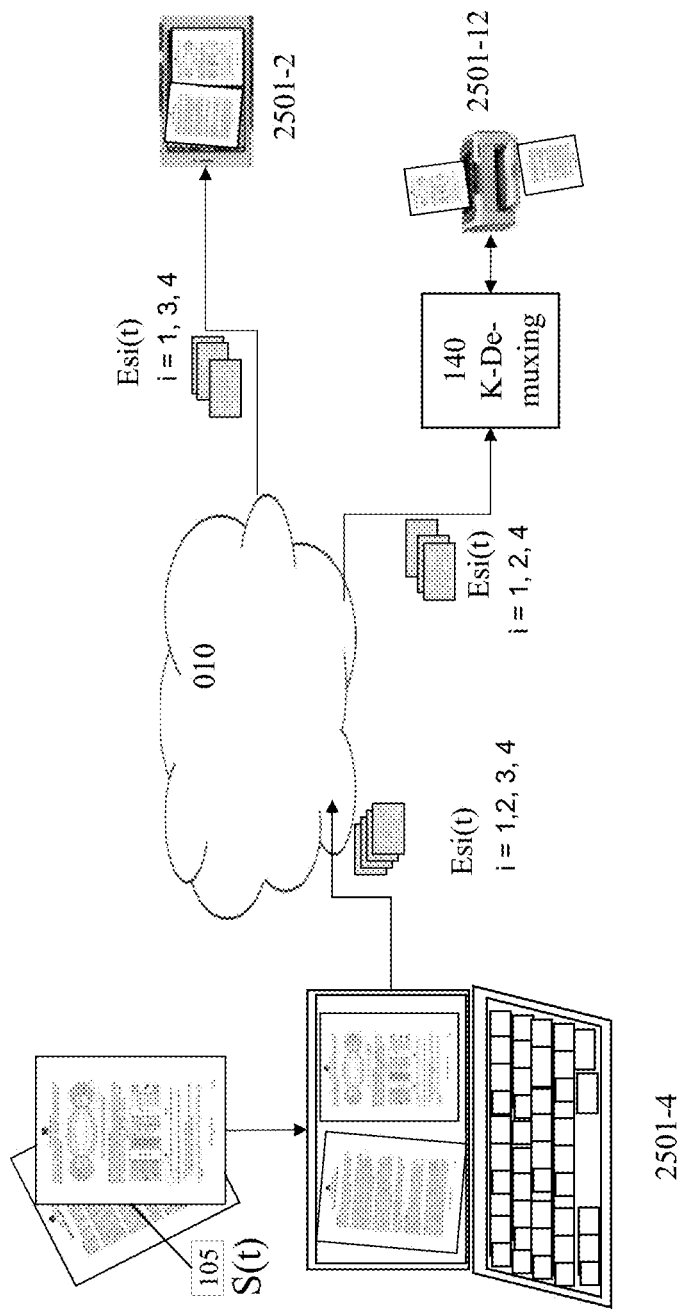

K-Muxing/Demuxing in a mobile device
*Data in distributed cloud storage with a 2 for 4 redundancy*

Flow charts
mobile voice messaging and remote accessing

Flow charts for mobile voice messaging with privacy and selectable redundancy

MOBILE SCANNER VIA PRIVATE DATA ON CLOUD

RELATED APPLICATIONS

This application claims priority to U.S. provisional patent application No. 62/207,032 filed on Sep. 10, 2015, which is incorporated herein by reference in its entirety. This application is also related to 1. U.S. Pat. No. 8,111,646; "Communication System For Dynamically Combining Power From A Plurality Of Propagation Channels In Order To Improve Power Levels Of Transmitted Signals Without Affecting Receiver And Propagation Segment," Issued on Feb. 7, 2012.
2. U.S. Pat. No. 8,098,612; "Apparatus And The Method For Remote Beam Forming For Satellite Broadcasting Systems," Issued on Jan. 17, 2012.
3. U.S. Pat. Appl. Pub. No. 20110197740; "Novel Karaoke and Multi-Channel Data Recording/Transmission Techniques via Wavefront Multiplexing and Demultiplexing," published on Aug. 18, 2011.
4. US Pat. Appl. Pub. No. 20130333544 A1; "Novel Karaoke and Multi-Channel Data Recording/Transmission Techniques via Wavefront Multiplexing and Demultiplexing," filed on Jul. 10, 2013, published on Dec. 19, 2013.
5. U.S. Pat. Appl. Pub. No. 20140081989; "Wavefront Muxing and Demuxing for Cloud Data Storage and Transport," published on Mar. 20, 2014.
6. U.S. Pat. Appl. Pub. No. 20150248431; "Survivable Cloud Data Storage and Transport," published on Sep. 3, 2015.

All of the above are incorporated herein by reference in their entireties.

FIELD OF THE DISCLOSURE

There are many application programs which can turns smart phones into a mini scanner for documents, photos, receipts and other texts. These applications include Tiny-Scan, DocScan, WorldScan, Genius Scan, Fast Scanner, TurboScan, PDF Reader, and many others. With the applications on mobile devices such as a smart phone, documents can be scanned at anywhere and stored or email as PDF files. These well designed software applications are easy to use, and their interfaces are user friendly. Mostly they use fast algorithms and detect page frame automatically. They provide different modes for various files, color, grayscale, black & white. And each mode shows a good contrast. They can create a PDF document with multiple scans. These documents can be protected with password, and may need for better privacy and survivability for storage and transport on cloud.

This invention addresses how protecting scanned documents and audio message using techniques of wavefront multiplexing (WF muxing or K-muxing) and wavefront demultiplexing (WF demuxing or K-demuxing). Digital documents in PC or mobile devices are sent via cloud in forms of WF muxed (K-muxed) formats, stored on cloud in forms of WF muxed (K-muxed) formats. The WF muxing/demuxing technology was originated from smart antenna methodology and wave propagation theory for satellite communications applications and has been documented in the first and the second references in the above US patent and patent application list. WF muxing/demuxing or K-muxing/demuxing, embodying an architecture that utilizes multi-dimensional transmissions, has found applications in fields beyond the satellite communication domain. One such application is data storage and transport as disclosed in the third reference.

BACKGROUND

Security on data storage are important concerns on cloud computing. Wavefront multiplexing/demultiplexing (WF muxing/demuxing) process embodies an architecture that utilizes multi-dimensional waveforms in cloud data storage. Multiple data sets are preprocessed by WF muxing before stored. WF muxed data is aggregated data from multiple data sets that have been "customized processed" and disassembled into any scalable number of sets of processed data, with each set being stored on a storage site. The original data is reassembled via WF demuxing after retrieving a lesser but scalable number of WF muxed data sets. In short, the WF muxed data storage solution enhances data security and data redundancy by, respectively, creating a new dimension to existing security/privacy methods and significantly reducing the storage space needed for data redundancy. In addition, WF muxing/demuxing methods enable a monitoring capability on the integrity of stored data.

K-space is also a well understood term in solid state physics and Imaging processing. The k-space can refer to:
1. Another name for the frequency domain but referring to a spatial rather than temporal frequency
2. Reciprocal space for the Fourier transform of a spatial function
3. Momentum space for the vector space of possible values of momentum for a particle
4. The k-space in magnetic resonance imaging (MRI)
  a formalism of k-space widely used in magnetic resonance imaging (MRI) introduced in 1979 by Likes and in 1983 by Ljunggren and Twieg.
  In MRI physics, k-space is the 2D or 3D Fourier transform of the MR image measured.

We shall introduce the following terms
1. K-mux, Kmux, or KMx for the Wavefront multiplex or the WF mux;
2. K-muxing, Kmuxing, or KMxing for the Wavefront multiplexing or the WF muxing, and
3. K-muxed, Kmuxed, or KMxed for the Wavefront multiplexed or the WF muxed;
4. K-demux, Kdemux, or KdeMx for the Wavefront demultiplex or the WF demux;
5. K-demuxing, Kdemuxing, or KdeMxing for the Wavefront demultiplexing or the WF demuxing, and
6. K-demuxed, Kdemuxed, or KdeMxed for the Wavefront demultiplexed or the WF demuxed;

In Electromagnetic (EM) theory, the letter K is often used to represent a directional vector and is a wave number in a propagation direction. The term $(\omega t - \underline{K} \cdot \underline{R})$ has been used extensively for propagation phase, where $\underline{K}$ represents a directional (moving) surface and $\underline{R}$ a directional propagation displacement. Therefore K is a "wavefront" mathematically. We will be using K-space as wavefront domain or wavefront space.

SUMMARY OF THE INVENTION

The disclosure relates to methods and architectures of distributed data storage using Wavefront multiplexing (WF muxing) or simply K-muxing on moving devices for applications including mobile scanning and remote printing. The applications also include audio recording and playing via mobile devices and/or PC. These scanned documents or recorded audios by mobile devices become available potentially to all devices with IP connectivity once the documents uploaded on cloud. The invention is focused to data privacy, redundancy, storage reliability, and survivability. The WF muxing or K-muxing techniques will use less memory space to achieve better redundancy, reliability, and survivability as compared to conventional techniques of (1) segmenting, or striping, a stream of data into M substreams, (2) creating additional N redundancy among the M substreams via parity or equivalent techniques, and (3) encrypting all M+N sets of substreams before storing them in M+N separated data storage space.

Effectively, the techniques feature aggregations of multiple and distributed storages to function as a larger virtual storage space. In addition, these proposed techniques enable the capabilities of monitoring data integrity of stored data sets without scrutinizing the stored data sets themselves. The same techniques can be extended to data streaming via cloud.

This invention application addresses enhanced privacy, reliability, and survivability of stored data, and data transports on cloud via wavefront multiplexing (WF muxing)/demultiplexing (demuxing) or K-muxing/demuxing methods and techniques. Since stored data on multiple sites is preprocessed on client sides, each of the stored data on cloud is a multiplexed (muxed) data set individually which is unintelligible by itself. Therefore, the proposed approaches shall remove the concerns on integrity confidence of operators, and those on the right of stored data. Camouflaged (image) cloud data storage and transport is one highlight of this application. Embodiments of "writing" and "reading" processes will be presented. "Writing" features a process on multiple original images concurrently via WF muxing transformations, generating WF muxed (image) data to be stored on cloud. A "reading" process corresponds to a WF demuxing transformation on WF muxed (image) data stored on cloud, reconstituting original (image) data sets.

Wavefront multiplexing/demultiplexing (WF muxing/demuxing) process features an algorithm invented by Spatial Digital Systems (SDS) for satellite communications where transmissions demand a high degree of power combining, security, reliability, and optimization [1,2]. WF muxing/demuxing, embodying an architecture that utilizes multidimensional transmissions, has found applications in fields beyond the satellite communication domain. One such application is data storage on cloud where privacy, data integrity, and redundancy are important for both data transports and data storage. User devices include fixed desktop personal computers (PC), relocatable notebooks, and portable devices, including smart phones and smart tablets such as iPhone, and iPad.

A method for storing data in IP cloud comprises: transforming multiple first data sets into multiple second data sets at a transmitting site, wherein one of said second data sets comprises a weighted sum of said first data sets; storing said second data sets in an IP cloud via an Internet; and storing multiple links linking to said second data sets at said transmitting site. In accordance with an embodiment, the method may comprise storing said second data sets at a receiving site via Internet in accordance with said links.

In accordance with an embodiment, the method may comprise storing said second data sets at a receiving site via Internet in accordance with said links.

In accordance with an embodiment, the method may comprise transforming said second data sets into multiple third data sets at a receiving site, wherein one of said third data sets comprises a weighted sum of said second data sets.

In accordance with an embodiment, one of said second data sets carries an image with intensities mainly controlled by one of said first data sets.

A data processing method comprises: transforming multiple first data sets and a known data set into multiple second data sets at a transmitting site, wherein one of said second data sets comprises a weighted sum of said first data sets; and recovering a third data sets from some of said second data sets and said known data set at a receiving site, wherein one of said third data sets comprises a weighted sum of said some of said second data sets.

A method for storing data in IP cloud, comprises: transforming multiple first data sets into multiple second data sets at a transmitting site, wherein one of said second data sets comprises a weighted sum of said first data sets and carries an image with intensities mainly controlled by one of said first data sets.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 9A illustrates a simplified version of the same block diagram in FIG. 9 in accordance of some embodiments of this invention. The cloud storage features data privacy and a 3 for 4 redundancy.

DETAILED DESCRIPTION OF THE INVENTION

In this disclosure we shall focus, among other features, on how the functions of data redundancy in storage are created on mobile devices. The present invention relates to distributed data storages with built-in redundancy for a single stream data subdivided into M multiple data substreams or M independent data streams, converted into a WF muxed domain (or a K-muxed domain) with M+N output wavefront components (wfcs), and stored these M+N wfc output data into N+M separated data storage sets, where N and M are integers and N>0. We may refer the M original data streams as original value-data sets or simply value-data sets. As a result, the M+N stored-data sets are wavefront components in forms of linear combinations of the M original value-data sets, which are derivable from the M value-data sets themselves.

Figure 1:
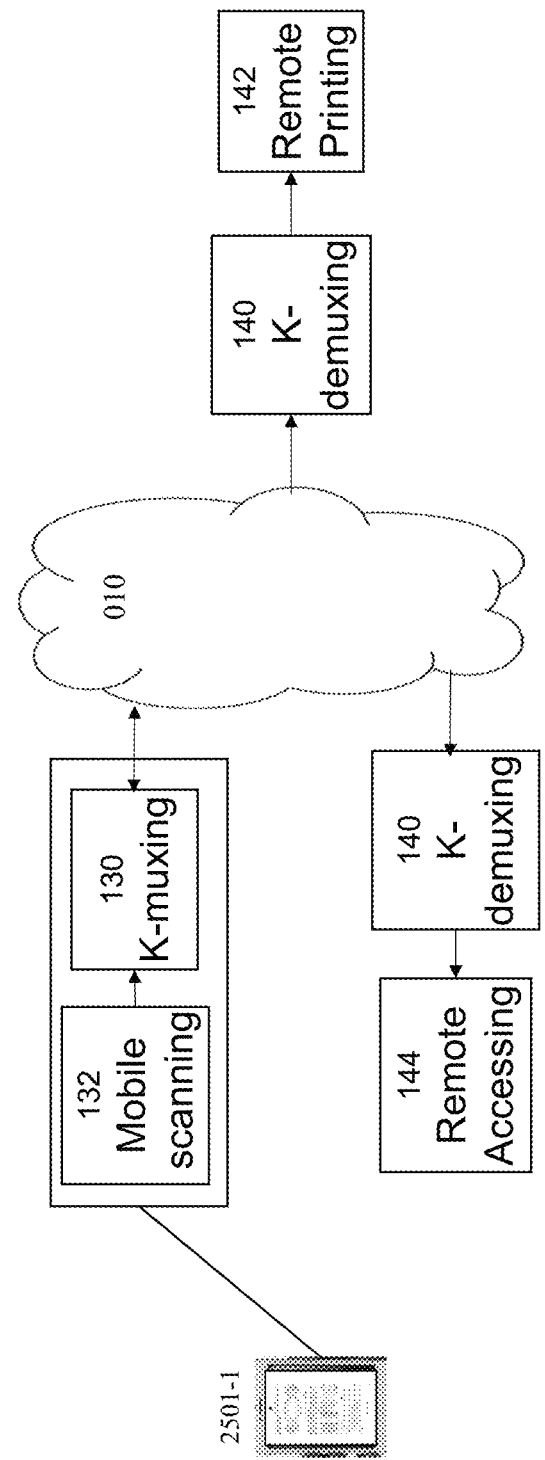
FIG. 1 depicts a functional flow diagram of mobile scanning and remote accessing for private data storage on distributed data in accordance of some embodiments of this invention.

From a linear algebra point of view, it is adequate to use M stored-data sets to represent M value-data sets. However, if we use M+N stored-data sets to represent only M value-data sets; then there are opportunities to have N redundant stored-data sets among the total M+N stored-data sets; creating a M for M+N redundancy structure. We only require any M of the M+N stored-data sets to recover embedded M value-data sets, or N redundant stored data sets FIG. 1 depicts a functional flow diagram of mobile scanning and remote accessing for private data storage on distributed data in accordance of some embodiments of this invention. A 2-page invoice from a law firm is scanned by an application of mobile scanning 131 in a first smart phone 2501-1. In addition, the two scanned pages generated in the application are combined into a scanned document, which may be in a PDF format. The scanned PDF document is then further processed via K-muxing 130 in the first smart phone; segmenting the documents into N-pieces and transforming the N-segments to N-K-muxed files which will then be sent and stored individually in storages distributed on cloud 010 for later usage. Let us assume that N=16. Furthermore, we have configured the K-muxing 130 to feature a 14-for-16 redundancy in the K-muxed and then cloud stored data. To reconstitute a copy of original pdf file in a remote accessing, only 14 out of the 16 stored K-muxed files are required.

In a remote accessing site, 15 of the 16 individually stored K-muxed files on cloud is available. With 15 available but 14 required on stored muxed files, we shall have 15 different sets of choices in recovering the original scanned PDF documents via a corresponding K-demuxing 140; thus 15 versions of the recovered documents are generated. When there are no contaminations in any storages on cloud, the 15 copies shall be identical, and can be printed via on a printer with capability of remote printing 142, or displayed or stored locally via applications with remote accessing 141 on a second mobile device.

On the other hand, if there are contaminations only in one storage, then one of the 15 copies shall be the right scanned document. Further processing is required to identify the "right" copy among the 15 versions. We shall discuss capability of data integrity check, as well as that for stored data error corrections and limitations via techniques of K-muxing and K-demuxing later in this patent application.

Figure 2:
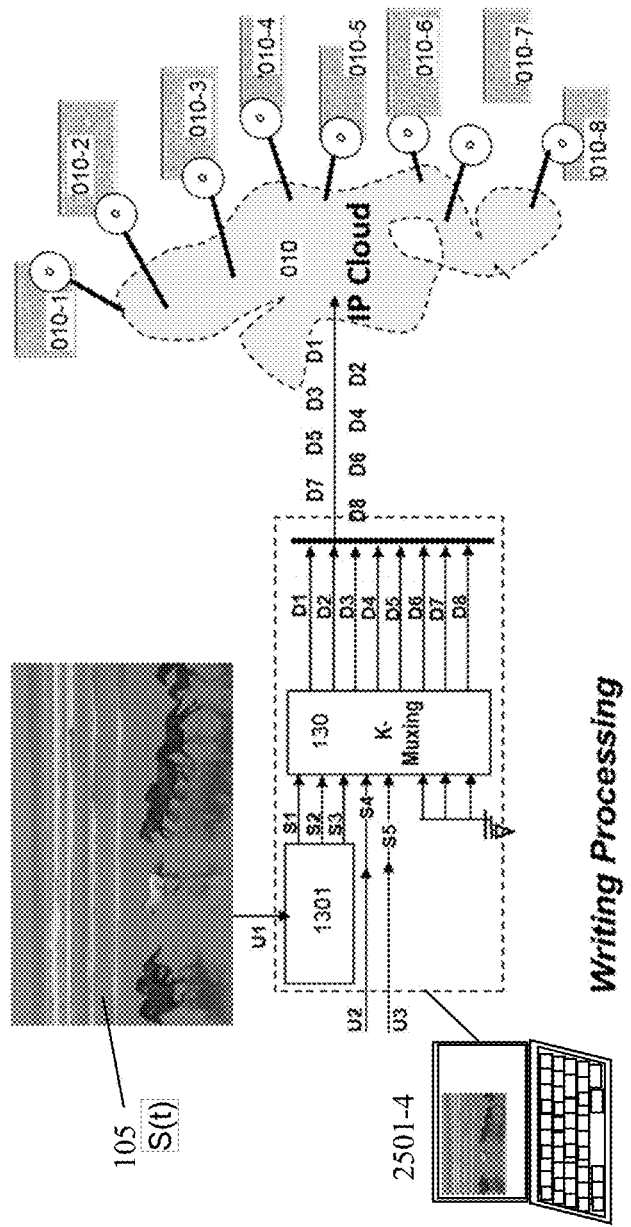
FIG. 2 depicts a block diagram of "writing" data on distributed data storage on cloud for 3 independent data sets via techniques of 8-to-8 Wavefront muxing also known as K-muxing. The block diagram is modified from FIG. 2A in the US patent application publication No.: US20140081989.

FIG. 2 is modified from the FIG. 2 of US patent application publication No. US20140081989, and depicts a writing process in a notebook 2501-4 to store 5 sets of data, S1, S2, S3, S4 and S5, in 8 physically separated data storage sites 010-1 to 010-8 connected through IP Cloud 010. The writing process features techniques of wavefront multiplexing (WF muxing or a K-muxing 130). The 8-to-8 K-muxing 130 features 8 inputs and 8 outputs. Three of the 8 inputs are grounded. Furthermore, the first three data sets, S1, S2 and S3, are results of segmenting a data set 105 belonged to a first user, U1, by a segmentation processor 1301. The data set 105 is a short video clip on wild life. Input data sets S4 and S5 belong to second and third users, U2 and U3 respectively. The 3 other inputs to the 8-to-8 K-muxing 130 are ground.

In a pre-storage processing, the 8-to-8 K muxing 130 is used to convert 5 sets of input data S1, S2, S3, S4 and S5, to 8 sets of output data, i.e. D1, D2, D3, D4, D5, D6, D7 and D8, where:

$$D1 = S1 + S2 + S3 + S4 + S5 \quad (1\text{-}1)$$

$$D2 = S1 - S2 + S3 - S4 + S5 \quad (1\text{-}2)$$

$$D3 = S1 + S2 - S3 - S4 + S5 \quad (1\text{-}3)$$

$$D4 = S1 - S2 - S3 + S4 + S5 \quad (1\text{-}4)$$

$$D5 = S1 + S2 + S3 + S4 - S5 \quad (1\text{-}5)$$

$$D6 = S1 - S2 + S3 - S4 - S5 \quad (1\text{-}6)$$

$$D7 = S1 + S2 - S3 - S4 - S5 \quad (1\text{-}7)$$

$$D8 = S1 - S2 - S3 + S4 - S5 \quad (1\text{-}8)$$

A 8-to-8 Hadamard matrix HM, in which all elements are "1" or "−1" was chosen for the 8-to-8 K-muxing. The 8-to-8 K-muxing may be implemented by other orthogonal matrix such as Fourier Transform or any 8×8 full rank matrixes with realizable inversed matrixes. The 8-to-8 K-muxing may also be implemented by other 8×8 full rank non-orthogonal matrix with realizable inversed matrixes.

The input ports of the K-muxing 130 are referred to as slices, and its output ports are wavefront components (wfc's). In this example, the five input data sets, i.e. S1, S2, S3, S4 and S5, are connected to the input ports, i.e. slice 1, slice 2, slice 3, slice 4 and slice 5, of the K-muxing 130 respectively. The 8 output data sets, i.e. D1-D8, are connected to the output ports, i.e. wfc1-wfc8, of the K-muxing 130 respectively.

To create effective redundancy for data storage on cloud, two of the three grounding inputs, say the inputs of the $6^{th}$ and the $7^{th}$ slices, shall be assigned as weighted sums of "all other 6 inputs" for Hadamard Matrixes and many orthogonal matrixes instead of a constant. In this case the last input slice for the 8-to-8 is grounded or assigned a constant value of zero.

$$D1 = S1 + S2 + S3 + S4 + S5 + f1 + f2 + 0 \quad (1\text{-}1a)$$

$$D2 = S1 - S2 + S3 - S4 + S5 - f1 + f2 - 0 \quad (1\text{-}2a)$$

$$D3 = S1 + S2 - S3 - S4 + S5 + f1 - f2 - 0 \quad (1\text{-}3a)$$

$$D4 = S1 - S2 - S3 + S4 + S5 - f1 - f2 + 0 \quad (1\text{-}4a)$$

$$D5 = S1 + S2 + S3 + S4 - S5 - f1 - f2 - 0 \quad (1\text{-}5a)$$

$$D6 = S1 - S2 + S3 - S4 - S5 + f1 - f2 + 0 \quad (1\text{-}6a)$$

$$D7 = S1 + S2 - S3 - S4 - S5 - f1 + f2 + 0 \quad (1\text{-}7a)$$

$$D8 = S1 - S2 - S3 + S4 - S5 + f1 + f2 - 0 \quad (1\text{-}8a)$$

$$\text{where } f1 = S1 + 2 \ast S2 + S3 + S4 + S5 + 0 \quad (1\text{-}9a)$$

$$f2 = S1 + S2 + 2 \ast S3 + S4 - S5 + 0 \quad (1\text{-}9b)$$

Equations (1-1a) to (1-8a) can be written in a matrix form as $$D = HM \ast S \quad (2)$$

where: $D = [D1, D2, D3, D4, D5, D6, D7, D8]^T$ (2-1)

$$HM = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad (2\text{-}2)$$

$$S = [S1, S2, S3, S4, S5, f1, f2, 0]^T \quad (2\text{-}3)$$

When the K muxing is connected by a unity input data set only, e.g. S4=[1] through the input port of slice 4 and S1=S2=S3=S5=f1=f2=0, the corresponding outputs of the WF muxer are written as:

$$D1 \text{ port} = S1 + S2 + S3 + S4 + S5 + f1 + f2 + 0 = [1] \quad (3\text{-}1)$$

$$D2 \text{ port} = S1 - S2 + S3 - S4 + S5 - f1 + f2 - 0 = [-1] \quad (3\text{-}2)$$

$$D3 \text{ port} = S1 + S2 - S3 - S4 + S5 + f1 - f2 - 0 = [-1] \quad (3\text{-}3)$$

$$D4 \text{ port} = S1 - S2 - S3 + S4 + S5 - f1 - f2 + 0 = [1] \quad (3\text{-}4)$$

$$D5 \text{ port} = S1 + S2 + S3 + S4 - S5 - f1 - f2 - 0 = [1] \quad (3\text{-}5)$$

$$D6 \text{ port} = S1 - S2 + S3 - S4 - S5 + f1 - f2 + 0 = [-1] \quad (3\text{-}6)$$

$$D7 \text{ port} = S1 + S2 - S3 - S4 - S5 - f1 + f2 + 0 = [-1] \quad (3\text{-}7)$$

$$D8 \text{ port} = S1 - S2 - S3 + S4 - S5 + f1 + f2 - 0 = [1] \quad (3\text{-}8)$$

The 8 output data sets are represented as a column vector or an output column matrix. The elements of the output matrix D, under the condition, become identical to the 8 elements in the $4^{th}$ column of the HM. In this case, the wavefront vector of the output data sets representing the matrix D is referred to as the $4^{th}$ wavefront vector (WFV), or WFV4. Similarly, the wavefront vector associated with the $k^{th}$ input port, Slice k, is referred to as $k^{th}$ WFV or WFVk. A WF vector specifies the distribution of a set of input data among the 8-output ports or among 8 aggregated output data sets, i.e. D1, D2, D3, D4, D5, D6, D7 and D8.

In general an 8-to-8 WF muxer, such as the K-muxing 130, features 8 orthogonal WFV's. Let us define a coefficient wjk of a Wavefront (WF) transform, or a K-transform performed by the K-muxing 130 to be the coefficient at the $j^{th}$ row and $k^{th}$ column of the K-muxing 130. A WF vector of the K-muxing 130 featuring a distribution among the 8 outputs, i.e. D1-D8 at the 8 wavefront component (wfc) ports wfc1-wfc8, is defined as an 8-dimensional vector.

With 8 wfc ports in the 8-to-8 K-muxing 130, there shall be 8 mutually orthogonal WFVs. The first 5 WFVs are:

$$WFV1 = [w11, w21, w31, w41, w51, w61, w71, w81]^T \quad (4.1)$$

$$WFV2 = [w12, w22, w32, w42, w52, w62, w72, w82]^T \quad (4.2)$$

$$WFV3 = [w13, w23, w33, w43, w53, w63, w73, w83]^T \quad (4.3)$$

$$WFV4 = [w14, w24, w34, w44, w54, w64, w74, w84]^T \quad (4.4)$$

$$WFV5 = [w15, w25, w35, w45, w55, w65, w75, w85]^T \quad (4.5)$$

S1, S2, S3, S4, and S5 are "attached" to 5 WF vectors by respectively connected to the first five input ports of the K-muxing 130. Similarly f1 and f2 are attached to the WFV6 and the WFV7. As a result, there is a remaining WFV, i.e. WFV8, which is not "utilized" in this illustration. All components of the 8 orthogonal WFVs are related to input and output port numbers or (spatial) sequences, but are independent from the input and output data sets.

Each of the 8 outputs of the K-muxing 130, i.e. D1-D8, is a linear combination of the 8 inputs including S1-S5, f1 and f2. The linear combination with 8 inputs features a weighted sum with each input weighted by a corresponding weighting parameter. As a result, each of the 8 output, i.e. D1-D8, contains information associated with all of the 8 inputs including S1-S5, f1 and f2. The data storage sites 010-1 through 010-8 may store all the 8 output data sets D1-D8, respectively.

Figure 2A:
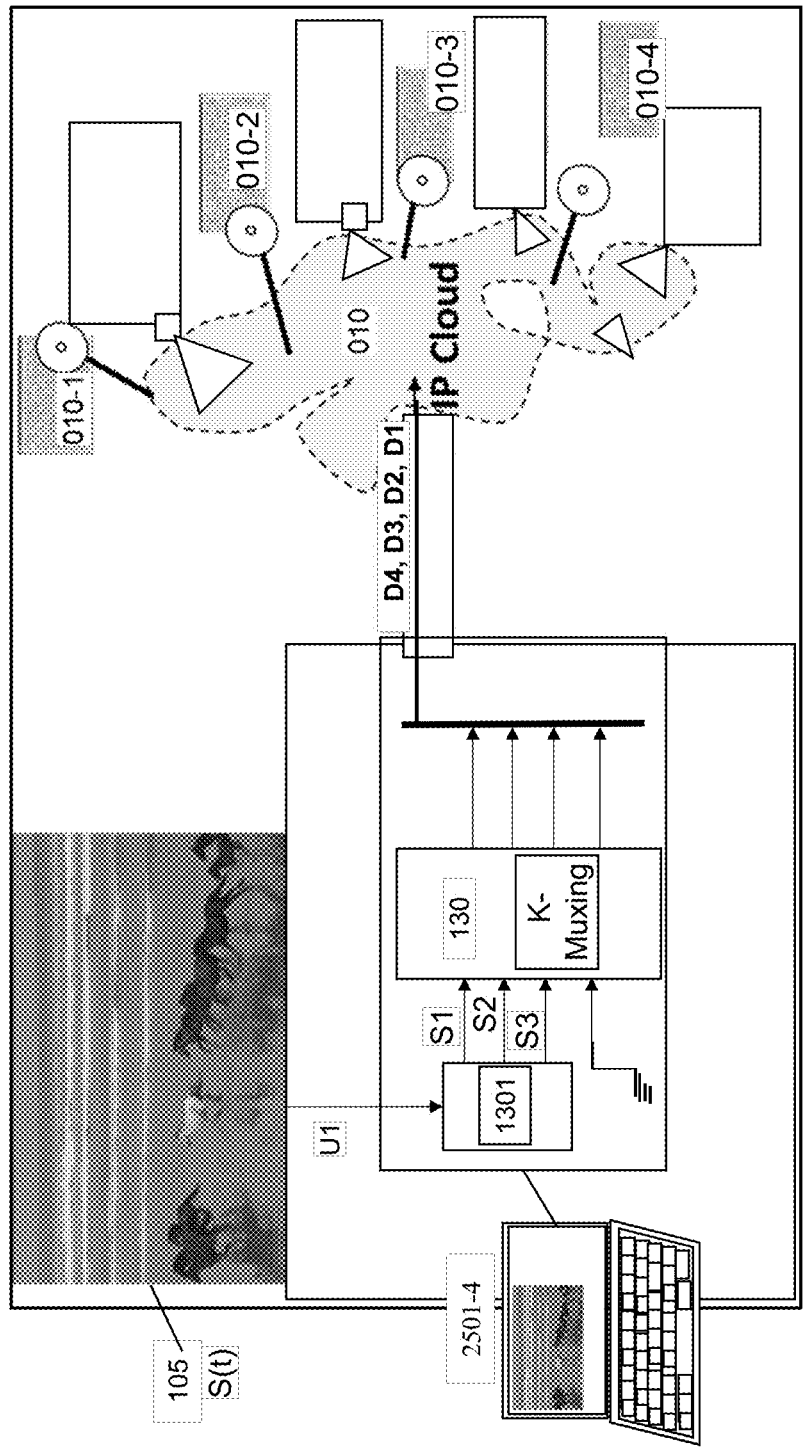
FIG. 2A depicts a block diagram on distributed data storage on cloud for an independent data set via techniques of 4-to-4 Wavefront muxing also known as K-muxing in accordance of some embodiments of this invention.

FIG. 2A depicts a writing process in a notebook 2501-4 to store 3 sets of data, S1, S2, and S3, in 4 physically separated data storage sites 010-1, 010-2, 010-3 and 010-4 connected through IP Cloud 010. The writing process features techniques of wavefront multiplexing (WF muxing or a K-muxing 130). The 4-to-4 K-muxing 130 features 4 inputs and 4 outputs. One of the 4 inputs is grounded. It may also be connected to a known constant or a known data stream. Furthermore, the first three data sets, S1, S2 and S3, are results of segmenting a data set S(t) by a segmentation processor 1301. The data set 105 is a short video clip on wild life. Again, the other input to the 4-to-4 K-muxing 130 is grounded.

In a pre-storage processing, the 4-to-4 K muxing 130 is used to convert 3 sets of input data, i.e. S1, S2, and S3 to 4 sets of output data, i.e. D1, D2, D3, and D4, where:

$$D1 = S1 + S2 + S3 \quad (5\text{-}1)$$

$$D2 = S1 - S2 + S3 \quad (5\text{-}2)$$

$$D3 = S1 + S2 - S3 \quad (5\text{-}3)$$

$$D4 = S1 - S2 - S3 \quad (5\text{-}4)$$

A 4-to-4 Hadamard matrix HM, in which all elements are "1" or "−1" is chosen for the 4-to-4 K-muxing. A 4-to-4 K-muxing may be implemented by other orthogonal matrix such as Fourier Transform or any 4×4 full rank matrixes with realizable inversed matrixes. A 4-to-4 K-muxing may also be implemented by other 4×4 full rank non-orthogonal matrixes with realizable inversed matrixes. Equations (5-1) to (5-4) can be written in a matrix form as $$D = HM * S \qquad (6)$$

where: $D = [D1, D2, D3, D4]^T$ (6-1)

$$HM = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \qquad (6\text{-}2)$$

$$S = [S1, S2, S3, 0]^T \qquad (6\text{-}3)$$

Similarly to FIG. 1, the wavefront vector associated with the $k^{th}$ input port, Slice k, is referred to as $k^{th}$ WFV or WFVk. A WF vector specifies the distribution of a set of input data among the 4-output ports or among 4 aggregated output data sets, i.e. D1, D2, D3 and D4.

In general a 4-to-4 WF muxer, such as a device with function of the 4-to-4 K-muxing 130, features 4 orthogonal WFV's. Let us define a coefficient wjk of a Wavefront (WF) transform, or a K-transform performed by the 4-to-4 K-muxing 130 to be the coefficient at the $j^{th}$ row and $k^{th}$ column of the K-muxing 130. A WF vector of the 4-to-4 K-muxing 130 featuring a distribution among the 4 outputs, i.e. D1, D2, D3, and D4 at the 4 wavefront component (wfc) ports wfc1-wfc4, is defined as a 4-dimensional vector.

With 4 wfc ports in the 4-to-4 K-muxing 130, there shall be 4 mutually orthogonal WFVs. The first 3 WFVs are:

$$WFV1 = [w11, w21, w31, w41]^T \qquad (7.1)$$

$$WFV2 = [w12, w22, w32, w42]^T \qquad (7.2)$$

$$WFV3 = [w13, w23, w33, w43]^T \qquad (7.3)$$

S1, S2, and S3 are "attached" to the 3 WF vectors by respectively connected to the first three input ports of the K-muxing 130. As a result, there is one remaining WFV, i.e. WFV4, which is not "utilized" in this illustration. All components of the 4 orthogonal WFVs are related to input and output port numbers or (spatial) sequences, but are independent from the input and output data sets.

Figure 2B:
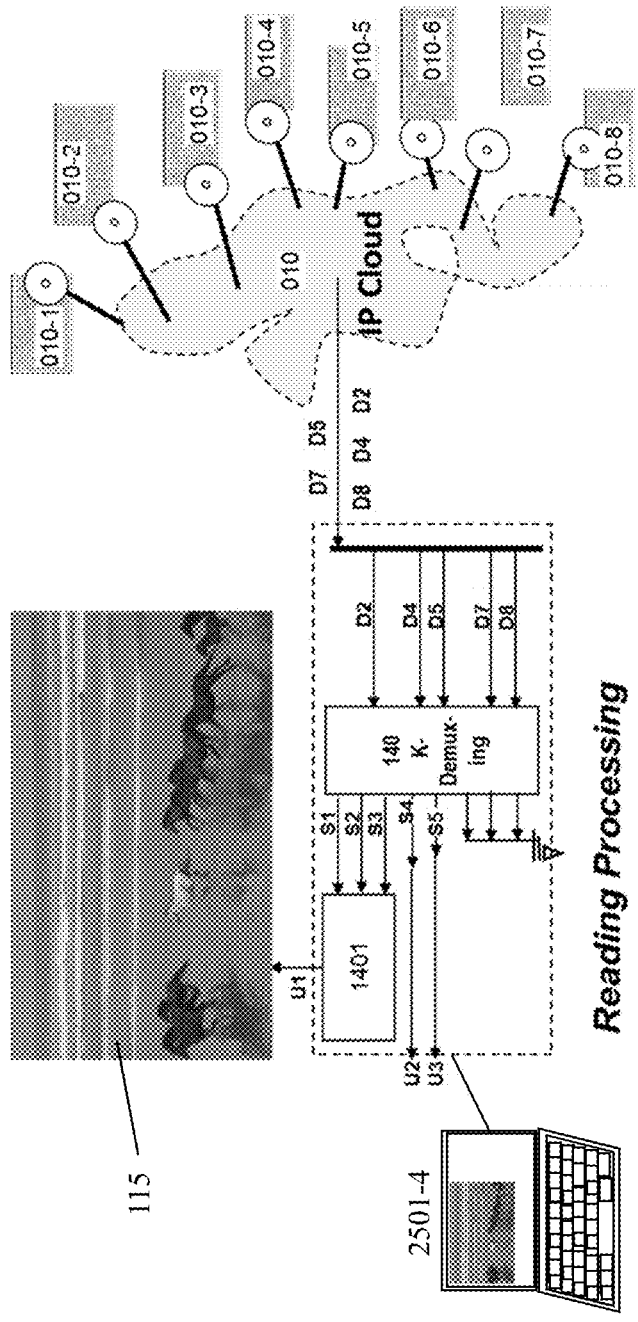
FIG. 2B depicts a block diagram on "reading" data from distributed data storage for 3 independent users U1, U2, and U3. Their data retrievals or reading processing from multiple (up to 8) stored data sets on cloud are via techniques of 8-to-8 Wavefront demuxing, also known as K-demuxing. It is modified from FIG. 2B in the US patent application publication No.: US20140081989.

FIG. 2B depicts a corresponding reading process to the writing process in FIG. 2. The WF demultiplexing techniques via an 8-to-8 K-demuxing 140 may be used to retrieve 5 sets of data, i.e. S1, S2, S3, S4 and S5, from any subset of five data sets of the eight physically separated data storage sites 010-1 through 010-8 connected through IP Cloud 010. In this example the select subset comprises of D2, D4, D5, D7 and D8.

After the 8-to-8 K-demuxing 140, ideally the first three data sets, i.e. S1, S2, and S3, are to be de-segmented or combined into a large data set S(t) 115 by a de-segmentation processor 1401. The recovered data set S(t) 115 shall be substantially equivalent to the input data set S(t) 105 in FIG. 2.

Referring to FIG. 2B, it shows the retrieval processing of the 5 recovered data. S1-S5 substantially equivalent to the input data sets S1-S5 respectively in FIG. 2, only when 5 stored data sets, i.e. D2, D4, D5, D7 and D8 substantially equivalent to the data sets D2, D4, D5, D7 and D8 respectively in FIG. 2, are accessible from five of the eight storage sites 010-1 through 010-8. Each of the outputs of the 8-to-8 K-demuxing 140 or retrieved data sets, S1-S5, is a linear combination of the 5 inputs D2, D4, D5, D7 and D8. The linear combination is a weighted sum of all 5 inputs; each weighted by a corresponding weighting parameter before a summing operation. Thus, each of the outputs or retrieved data sets S1-S5, contains information associated with all of the 5 inputs D2, D4, D5, D7 and D8. The retrieval process further includes the grouping of the first 3 retrieved data sets, i.e. S1, S2, and S3, into a large data set S(t) via a de-segmentation processor 1401. The retrieved data sets, i.e. S4 and S5, are substantially equivalent to the input data sets S4 and S5 respectively in FIG. 2.

When all 8 storage data sets become available, the 8-to-8 K-demuxing 140 can be efficiently implemented as a matrix inversion of the corresponding matrix for the 8-to-8 K-muxing 130 in FIG. 2. When K-muxing 130 implemented by a Hadamard matrix, the identical matrix can be used for efficient implementations for the K-demuxing 140.

No Redundancy K-Muxing in a Mobile Device

Figure 3:
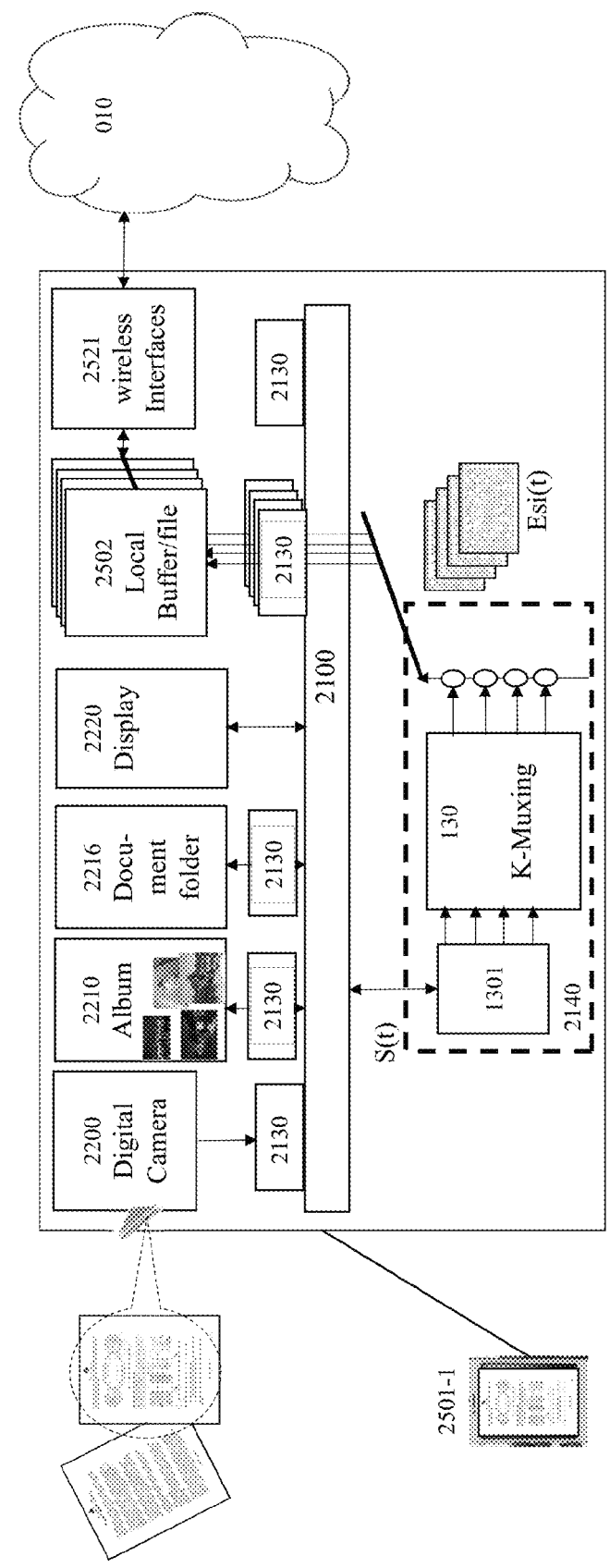
FIG. 3 depicts a block diagram of mobile scanning and a data writing processing for the scanned documents on distributed data storage on cloud via techniques of 4-to-4 Wavefront muxing also known as K-muxing from a mobile device. The cloud storage features data privacy but no redundancy in accordance of some embodiments of this invention.

FIG. 3 shows a software functional block diagram in a mobile device of K-muxing a data file for storage over distributed cloud storage without redundancy. The mobile device may be a smart phone 2501-1. A picture or a stream of pictures S(t) taken by an embedded digital camera 2200 in real time or stored in the local album 2210 is sent to one of the embedded applications 2130 for processing picture or pictures to become a scanned document which shall be stored in a document folder 2216 temporarily and may be in PDF format. Before the stored documents being sent for cloud storage as primary storage sites or backup storages, they shall be sent to a pre-processing application 2140 via an application program interface (API) 2100. The associated processed data sets are then sent to cloud 010 for storage through the API 2100 and then local buffers 2502. These various local buffers 2502 are individually associated with different software of the embedded applications 2130, including local file synchronization management of cloud storage such as Dropbox, Google drive, iCloud, OneDrive, and others.

The scanned document S(t) features a 2-page printed essay. The API 2100, a set of routines, protocols, and tools for building software applications, specifies how software components should interact and APIs are used when programming graphical user interface (GUI) components. A good API makes it easier to develop a program by providing all the building blocks. A programmer then puts the blocks together.

The preprocessing application 2140 comprises of software for segmenting 1301 which functions as a 1-to-4 TDM de-multiplexing or demuxing operation and that for K-Muxing 130 which is implemented by a 4-to-4 Hadamard matrix. The 1-to-4 TDM demuxing 1301 shall convert the data stream S(t) with a 4R samples per second into four data sub-streams, each with a flowing rate of a R samples per second. It may function in a mode of sample-to-sample operation, or a mode with block to block operation. For illustrations, we shall focus the operation in a mode-f sample-to-sample.

These four data substreams are then connected to the 4 inputs of the K-muxing 130 implemented by a 4-to-4 Hadamard matrix. Its four output Esi (or Es1, Es2, Es3, and Es4) are then uploaded to cloud through local buffers 2502 of various cloud storage operators. It is likely the connectivity of a mobile device such as the smart phone 2501-1 to cloud 010 is through wireless interfaces 2521 supporting WiFi links, cell phone band links, and/or others. The mobile device may also be connected to cloud services via Ethernet (not shown) or other wired connectivity or through USB transports when these non-wireless connectivity is available at home in once office, or other public facilities.

No Redundancy K-Demuxing in a Mobile Device

Figure 4:
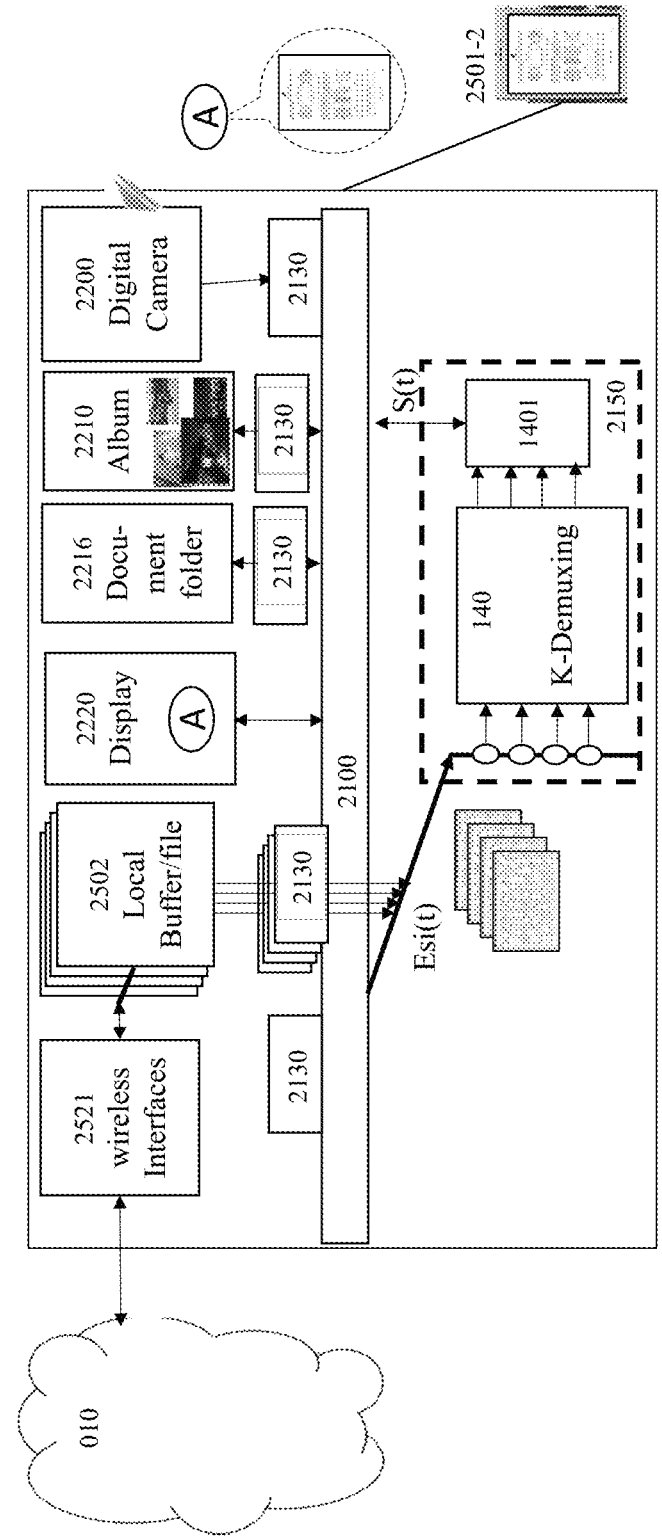
FIG. 4 depicts a block diagram of a remote accessing a data set (reading or retrieving processing from distributed data storage on cloud) for an image data set via techniques of 4-to-4 Wavefront demuxing also known as K-muxing in a mobile device. In accordance of some embodiments of this invention. The cloud storage features data privacy but no redundancy

FIG. 4 shows a software functional block diagram in a mobile device for recovering stored scanned documents by K-demuxing a set of muxed data files stored over distributed cloud storage without redundancy. The mobile device may be a smart phone 2501-2. Four sets of cloud stored files are requested and sent from cloud 010 to various local buffers 2502 via wireless interface 2521. Different ones of the applications 2300 associated various local buffers 2502 include local file synchronization management of cloud storage such as Dropbox, Google drive, iCloud, OneDrive, and others. These retrieved muxed data files Esi(t) including Es1, Es2, Es3, and Es4 are sent through API 2100 to a post-processing application 2150 which shall recover the stored scanned document S(t).

The post-processing application 2150 comprises of software for a 4-to-4 K-demuxing 140 which is implemented by a 4-to-4 Hadamard matrix and that for de-segmenting 1401 which functions as a 4-to-1 TDM multiplexing or muxing operation.

The 4 inputs of the 4-to-4 K-demuxing 140 are connected to the retrieved muxed data files Esi(t) and the 4 outputs shall be the 4 recovered data segments which are then connected to the function of de-segmenting 1401. The 1-to-4 TDM muxing 1401 shall convert the 4 recovered data segments S1, S2, S3, and S4; each with a feature of R samples per second into a reconstituted data stream with a flowing rate of a 4R samples per second.

The reconstituted scanned document S(t) is then sent via the API 2100 for presentation by a display 2220 in the mobile device 2501-2. It may also be sent for local storage or document folder 2216 via various ones of the embedded applications 2130 through the API 2100.

Cloud Data Storage/Recovery Via K-Muxing/Demuxing with No Redundancy

Figure 5:
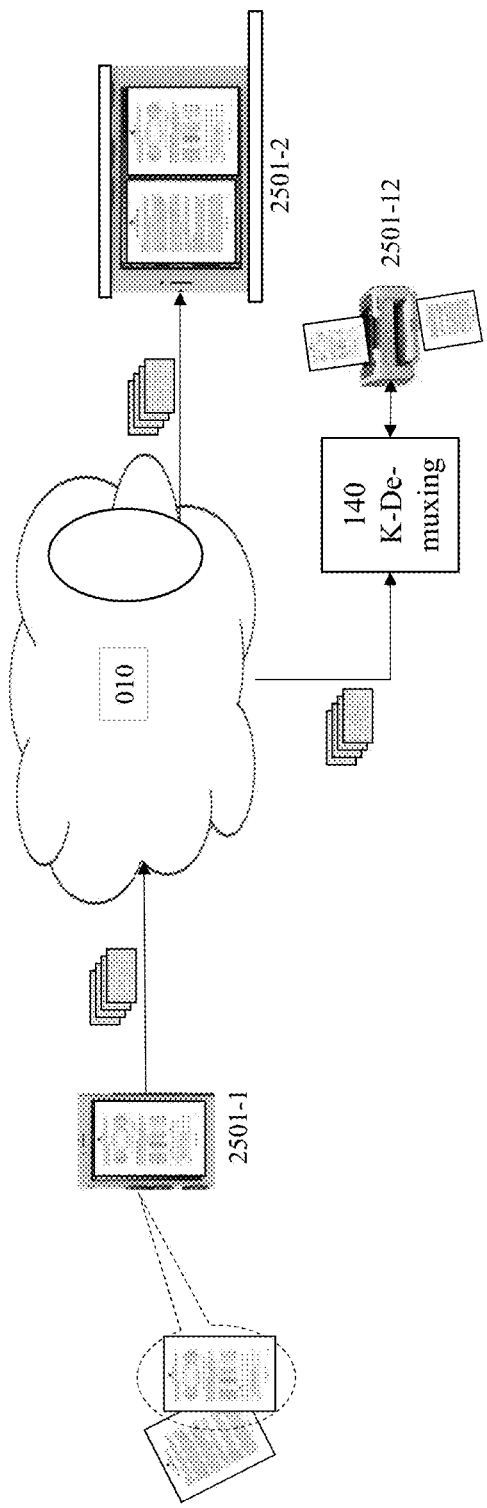
FIG. 5 depicts a block diagram of data writing on distributed data storage on cloud for a document via mobile scanning or an image and associated data reading processing or remote accessing in a mobile device via techniques of Wavefront muxing/demuxing, also known as K-muxing/demuxing in accordance of some embodiments of this invention. The cloud storage features data privacy but no redundancy.

FIG. 5 depict a top level functional block diagram for cloud storage techniques to use the memory space most efficiently for private data storage on cloud at the expense of survivability.

In a data storing or writing phase, a copy of a document scanned by a first smart phone 2501-1 in form of a digital data streams will be stored in distributed storages on cloud 010. The data stream of the scanned document has been preprocessed and become 4 processed segments or substreams before sent to the cloud 010.

In a data recovering or reading phase, a set of 4 processed segments or substreams stored on cloud shall be retrieved to a local post processor on a second smart phone 2501-2. The post processor on the second smart 2501-2 will reconstitute the image or the video data stream by processing the retrieved set of all 4 processed segments or substreams.

The preprocessing comprises of K-muxing 130, and may also feature erasure coding and encryptions or similar functions before sending processed data to cloud. The corresponding post processing comprises of K-demuxing 140, and may also feature erasure-code decoding and decryptions or similar functions after retrieving all cloud-stored data from the cloud 010.

The first smart-phone 2501-1 and the second smart-phone 2501-2 may be two different phones. They may refer to a same phone in different time slots and/or at different locations.

In another data recovering or reading phase, a set of 4 processed segments or substreams stored on cloud shall be retrieved to a local post processor for a remote printer 2501-12. The post processor on the second smart 2501-2 will reconstitute an associated data stream for the scanned document by processing the retrieved 4 processed segments or substreams by a corresponding post processing which comprises of K-demuxing 140. The associated 4 outputs from the K-demuxing 140 are then de-segmented to become recovered scanned document before sent for printing by a printer 2501-12.

K-Muxing with Redundancy in a Mobile Device

Figure 6:
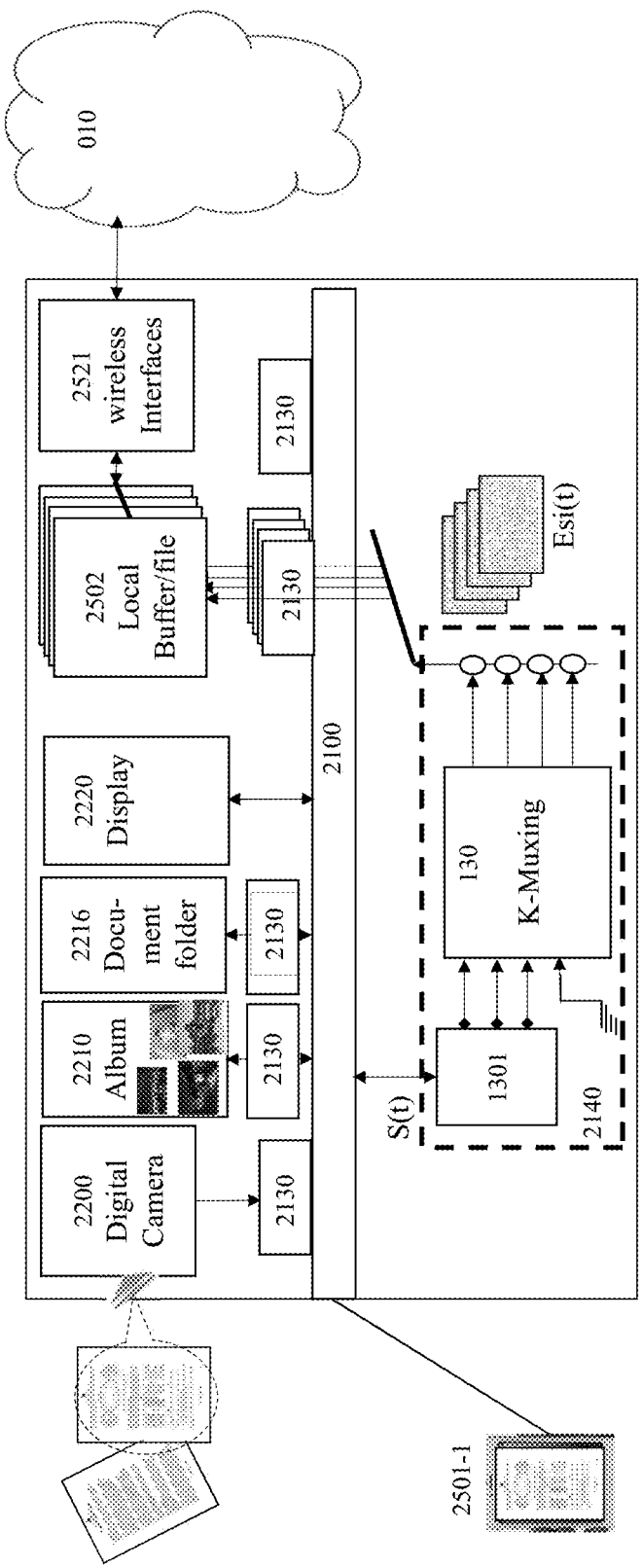
FIG. 6 depicts a block diagram of mobile scanning and a data writing processing on distributed data storage on cloud for a scanned document or an image data set via techniques of 4-to-4 Wavefront muxing also known as K-muxing from a mobile device in accordance of some embodiments of this invention. The cloud storage features data privacy and a 3 for 4 redundancy.

FIG. 6 shows a software functional block diagram in a mobile device of K-muxing a data file for storage over distributed cloud storage with a 3 for 4 redundancy. The mobile device may be a smart phone 2501-1. A scanned document S(t) taken by an embedded digital camera 2200 in real time or stored in the local album 2210 is sent to a pre-processing application 2140 via an application program interface (API) 2100, before sending the associated processed data sets to cloud 010 for storage through the API 2100 again and then local buffers 2502. These various local buffers 2502 are individually associated with different software of embedded applications 2130, including local file synchronization management of cloud storage such as Dropbox, Google drive, iCloud, OneDrive, and others.

The scanned document S(t) is taken from a 2-page essay. The API 2100, a set of routines, protocols, and tools for building software applications, specifies how software components should interact and APIs are used when programming graphical user interface (GUI) components. A good API makes it easier to develop a program by providing all the building blocks. A programmer then puts the blocks together.

The preprocessing application 2140 comprises of software for segmenting 1301 which functions as a 1-to-3 TDM de-multiplexing or demuxing operation and that for K-Muxing 130 which is implemented by a 4-to-4 Hadamard matrix. The 1-to-3 TDM demuxing 1301 shall convert the S(t) in form a digital data stream featuring a flow rate of 3R samples per second into three data sub-streams, each flowing at a rate of R samples per second. These three data substreams are then connected to 3 of the 4 inputs of the K-muxing 130 implemented by a 4-to-4 Hadamard matrix. The remaining $4^{th}$ input is grounded as shown, connected to a known constant, or fed by a known digital file. Its four outputs Esi (or Es1, Es2, Es3, and Es4) are then uploaded to cloud through local buffers 2502 of various cloud storage operators. It is likely the connectivity of a mobile device such as the smart phone 2501-1 to cloud 010 is through wireless interfaces 2521 supporting WiFi links, cell phone band links, and/or others. The mobile device may also be connected to cloud services via Ethernet (not shown) or other wired connectivity or through USB transports when these non-wireless connectivity is available at home in once office, or other public facilities.

K-Demuxing with Redundancy in a Mobile Device

Figure 7:
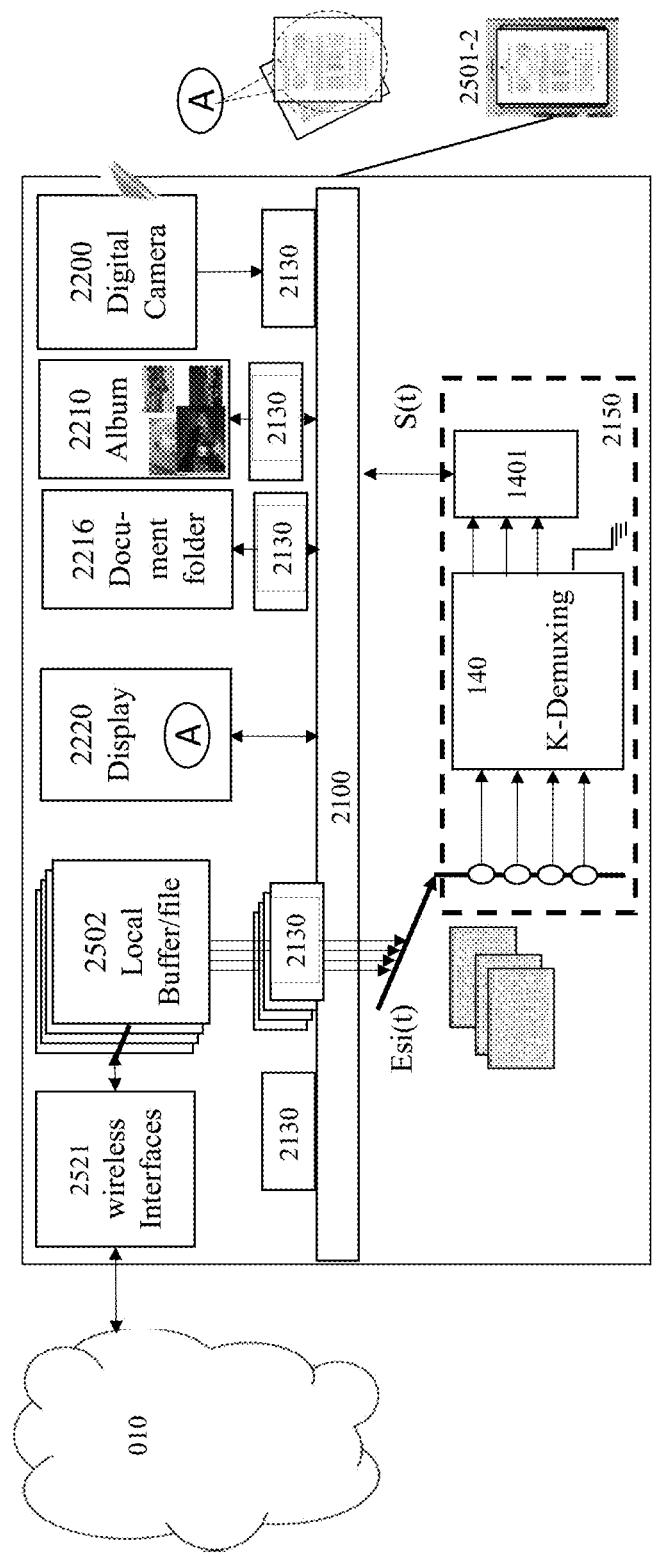
FIG. 7 depicts a block diagram of remote accessing or data reading process from distributed data storage on cloud for a scanned document or an image in a mobile device via techniques of Wavefront muxing/demuxing, also known as K-muxing/demuxing in accordance of some embodiments of this invention. The cloud storage features data privacy and a 3 for 4 redundancy.

FIG. 7 shows a software functional block diagram in a mobile device for recovering stored scanned document, and K-demuxing a set of muxed data substreams stored over distributed cloud storage with a 3 for 4 redundancy. The mobile device may be a smart phone 2501-2. Four sets of cloud stored substreams are requested and sent from cloud 010 to various local buffers 2502 via wireless interface 2521. Different ones of the embedded applications 2300 associated the various local buffers 2502 include file synchronization management of cloud storage such as Dropbox, Google drive, iCloud, OneDrive, and others. To recover the scanned document, we only need 3 out of the 4 stored data substreams. These retrieved muxed data substreams Esi(t) including Es1, Es2, Es3, and/or Es4 are sent through API 2100 to a post-processing application 2150 which shall recover the stored scanned document in form of a digital data stream S(t).

The post-processing application 2150 comprises of software for a 4-to-4 K-demuxing 140 which is implemented by a 4-to-4 Hadamard matrix and that for de-segmenting 1401 which functions as a 3-to-1 TDM multiplexing or muxing operation.

The 4 inputs of the 4-to-4 K-demuxing 140 are connected to any three of the 4 retrieved muxed data substreams Esi(t) and the 4 outputs shall feature a known output and the 3 recovered data substreams which are then connected to the de-segmenting processor 1401. The 1-to-3 TDM muxing for the de-segmenting 1401 shall convert the 3 recovered data substreams S1, S2, and S3; each with a data flow rate at R samples per second into a reconstituted data stream with a flowing rate of a 3R samples per second.

The reconstituted scanned document S(t) is then sent via the API 2100 for presentation by a display 2220 in the mobile device 2501-2. The reconstituted scanned document or digital stream S(t) may also be sent for local storage or document folder 2216 via various ones of the embedded applications 2130 through the API 2100.

Cloud Data Storage/Recovery with 3 for 4 Redundancy

Figure 8:
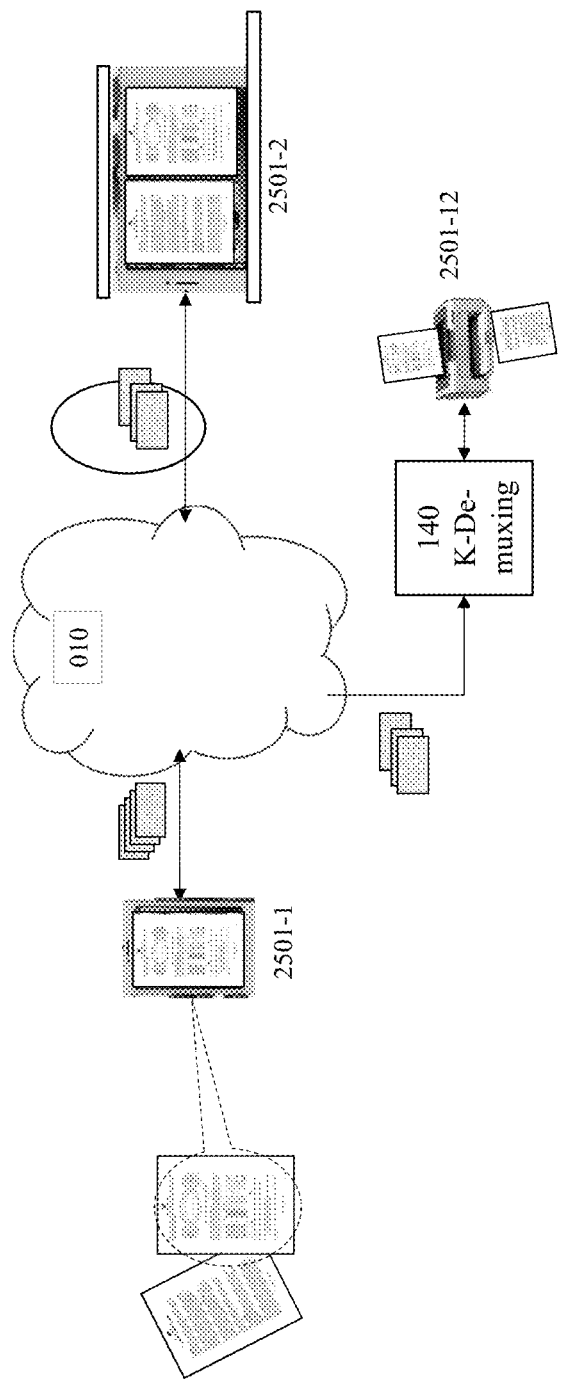
FIG. 8 depicts a block diagram of data writing on distributed data storage on cloud for a scanned document from smart phone or an image from a mobile device and associated data reading processing in another mobile device and a remote printing via techniques of Wavefront muxing/demuxing, also known as K-muxing/demuxing in accordance of some embodiments of this invention. The cloud storage features data privacy and a 3 for 4 redundancy.

FIG. 8 depict a top level functional block diagram for cloud storage techniques for private data storage on cloud with survivability.

In a data storing or writing phase, a scanned document in form of a data stream in a first smart phone 2501-1 will be stored in distributed storages on cloud 010. The digital data stream must be preprocessed and become 4 processed segments or substreams before sent to the cloud 010.

In a data recovering or reading phase, a set of any 3 from the 4 processed segments or substreams stored on cloud shall be retrieved to a local post processor on a second smart phone 2501-2. The post processor on the second smart 2501-2 will reconstitute a copy of the scanned document or the data stream by processing the retrieved set of any 3 from the 4 processed segments or substreams.

The preprocessing comprises of K-muxing 130, and may also feature erasure coding and encryptions or similar functions before sending processed data to cloud. The corresponding post processing comprises of K-demuxing 140, and may also feature erasure-code decoding and decryptions or similar functions after retrieving all cloud-stored data from the cloud 010.

It is important to point out that cloud stored data preprocessed by the K-muxing in FIG. 3 will not be useful at all for a post processing of the K-demuxing depicted in FIG. 7. Similarly, cloud stored data preprocessed by the K-muxing in FIG. 6 will not be useful at all for a post processing of the K-demuxing depicted in FIG. 4. It is noticed that the functions of the K-muxing 130 in FIG. 3 and that in FIG. 6 are identical and featuring a 4-to-4 Hadamard transform. Similarly, the functions of K-demuxing 140 in FIG. 4 and those in FIG. 7 also feature the same 4-to-4 Hadamard transform.

This is because the 4 data inputs to the K-muxing 130 in FIG. 3 are very different from those in FIG. 6. The former features a set of 4 data segments or data substreams in FIG. 3 while only 3 data segments or 3 data substreams are connected to 3 of the 4 inputs of the K-muxing 130 in FIG. 6. The remaining last input is connected not to data to be stored but to one known input signal. In fact the remaining input is grounded, effectively connected to a known signal always set at zero value.

Figure 9:
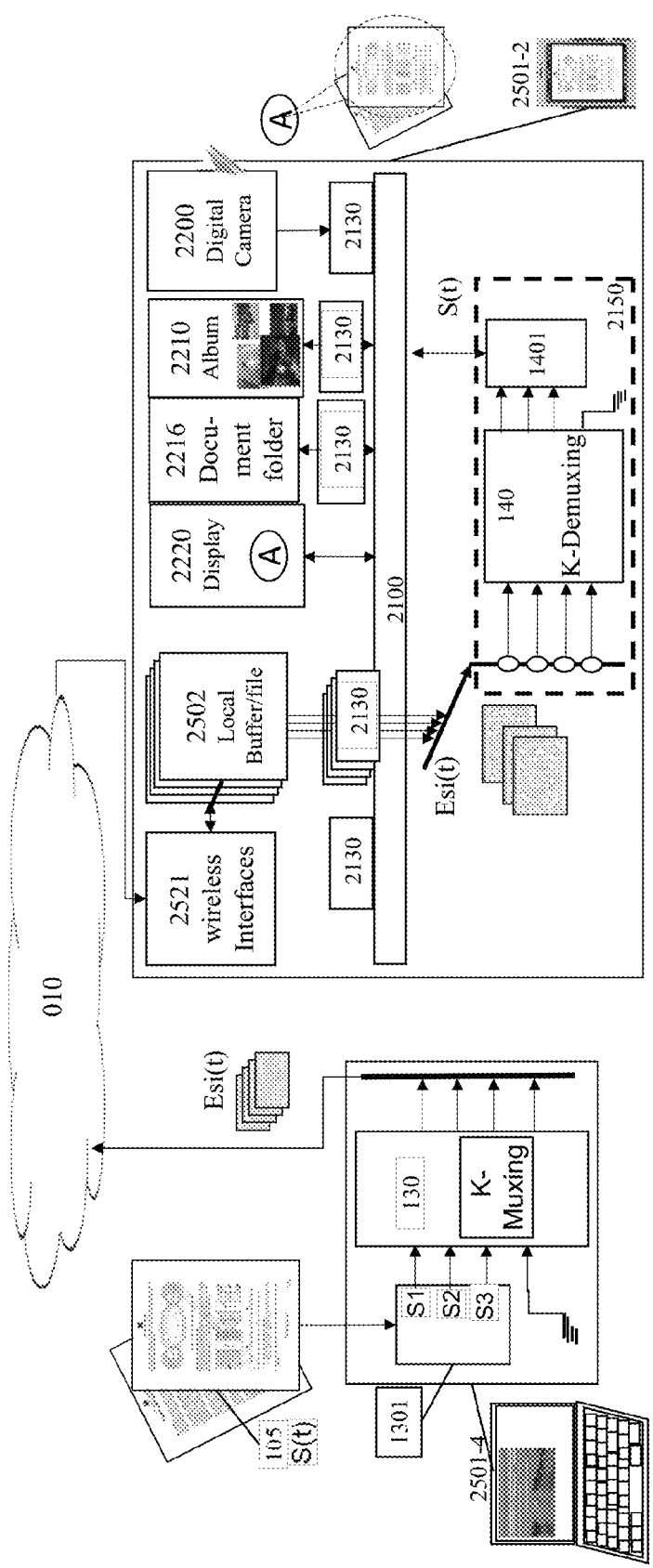
FIG. 9 depicts a block diagram of data writing on distributed data storage on cloud for a scanned document from a fixed PC or a notebook via techniques of Wavefront muxing or K-muxing; and associated data reading processing in a mobile device via techniques of Wavefront demuxing, also known as K-demuxing in accordance of some embodiments of this invention. The cloud storage features data privacy and a 3 for 4 redundancy.

On the other hand, FIG. 9 depicts an operation of using fixed PCs or a locatable notebook 2501-4 to upload to cloud a scanned document S(t) or a data stream via 4 processed data sets (Esi where i=1 to 4). It also shows operations of using portable or moving devices such as a smart phone 2501-2 to connect to the cloud 010 and to reconstitute the uploaded scanned document S(t) or data streams in various locations at a later time slot through any 3 out of the 4 cloud-stored processed data sets (Esi, where i=1, 2, 3, and 4).

On the left, the depicted writing processing in the notebook 2501-4 features a pre-processing to segment an input scanned document S(t) 105 or a data stream into 3 segments or data substreams S1, S2, and S3 by a segmenting processor 1301 first. A K-muxing 130 featuring 4 inputs and 4 outputs transform the 4 inputs including the 3 segments or the 3 data substreams and a known signal as the $4^{th}$ input to a set of 4 K-muxed outputs; Esi(t) where i=1, 2, 3, and 4. The port connected to the $4^{th}$ input depicted in here is grounded. As a result, the $4^{th}$ signal is a stream of constant of samples with a value of "zero." The $4^{th}$ input may also be connected to a known constant or a known data stream.

The stored data sets on cloud are processed data sets (Esi, where i=1, 2, 3, and 4) from a 4-to-4 K-muxing process. Each of these 4 file is a result of aggregation of the 3 segments; S1, S2, and S3, since the $4^{th}$ input is always zero in this configuration. The aggregation process features a sample-by-sample operation with each output sample as numerically weighted summing of all 3 corresponding input samples from the three segments; S1, S2, and S3. As a result, the outputs from a single K-muxed data set are un-intelligible. The sufficient conditions to reconstruct original data set will always require a minimum of 3 from the 4 K-muxed data set.

Furthermore, it is notice that there are 24 connectivity combinations between 4 input ports and 4 input signals. For any 4-to-4 K-muxing processor with same set of the 4 input signals, every one of the 24 combinations will result to a unique set of Esi; where i=1, 2, 3, and 4. Without the information in a K-demuxing operation, it will be difficult to reconstruct the original data set S(t) even we have retrieved from cloud all 4 stored K-muxed data sets (Esi; where i=1, 2, 3, and 4). The connectivity and other configuration information as well as configuration combinations shall be one of the important items in a registry for configuration management. Other configurations may include between 4 outputs of a K-muxing and accessible multiple storages on cloud including those on private cloud and other private local storages connected by IP networks.

A configuration registry shall have all file management information on stored files on cloud, including associated K-muxing configurations, outputs names and/or cloud storage locations, and other associated information for recovering the stored data. For a user the configuration registry may be centralized and stored on user's personnel devices or on cloud privately. It may also be stored on cloud in a distributed version. For private data files, the associated configuration registries may remain private even among multiple equipment at various locations in different time slots.

For sharing private data files on cloud among multiple users, the associated configuration registries must remain private but be shared among authorized users. Management of configuration registries may use public and private key techniques for additional privacy protection.

On the right side of FIG. 9, the depicted reading processing in the smart phone 2501-2 features a software functional block diagram in a mobile device for recovering stored scanned document by K-demuxing a set of muxed data substreams stored over distributed cloud storage with a 3 for 4 redundancy. The mobile device is a smart phone 2501-2. Four sets of cloud stored substreams are requested and sent from cloud 010 to various local buffers 2502 via wireless interface 2521. Different ones of embedded applications 2300 associated the various local buffers 2502 include local file synchronization management of cloud storage such as Dropbox, Google drive, iCloud, OneDrive, and others. Only 3 out of the 4 stored muxed data substreams (Esi; where i=1, 2, 3, and 4) are required. The retrieved muxed data substreams Esi(t) including Es1, Es2, Es3, and/or Es4 are sent through API 2100 to a post-processing application 2150 which shall recover the stored scanned document S(t) or a data stream.

The post-processing application 2150 comprises of software for a 4-to-4 K-demuxing 140 which is implemented by a 4-to-4 Hadamard matrix and that for a de-segmenting processor 1401 which functions as a 3-to-1 TDM multiplexing or muxing operation.

The 4 inputs of the 4-to-4 K-demuxing 140 are connected to any three of the 4 retrieved muxed data substreams Esi(t) and the 4 outputs shall be a known output and the 3 recovered data substreams which are then connected to the de-segmenting processor 1401. A 1-to-3 TDM muxing shall convert the 3 recovered data substreams S1, S2, and S3; each with a R samples per second into a reconstituted data stream with a flowing rate of a 3R samples per second.

The reconstituted scanned document or data stream S(t) is then sent via the API 2100 for presentation by a display 2220 in the smart phone 2501-2 or/and stored in a document folder 2216. The reconstituted scanned document S(t) may also be sent for local storage or buffering via various applications through the API 2100. S(t) in this example is a scanned document.

FIG. 9A depicts a simplified version of the functional block diagram in FIG. 9. It shows an operation of using fixed PCs or a locatable notebook 2501-4 to upload to cloud a scanned document S(t) or a data stream via 4 K-Muxed data sets (Esi where i=1 to 4). It also shows operations of using portable or mobile devices such as a smart phone 2501-2 to connect to the cloud 010 and to reconstitute the uploaded document S(t) or data streams in various locations at a later time slot through any 3 out of the 4 cloud-stored K-Muxed data sets (Esi, where i=1, 2, 3, and 4). S(t) is a scanned document, and may be in a PDF format. The selected K-Muxed files are Es1, Es3, and Es4.

On the right lower corner, the scanned document is recovered by post-processing any 3 out of the 4 cloud-stored K-Muxed data sets (Esi, where i=1, 2, 3, and 4) through processors of K-demuxing 140 and de-segmenting (not shown) before it is printed by a remote printer 2501-12. The selected K-Muxed files are Es1, Es2, and Es4.

Figure 9B:
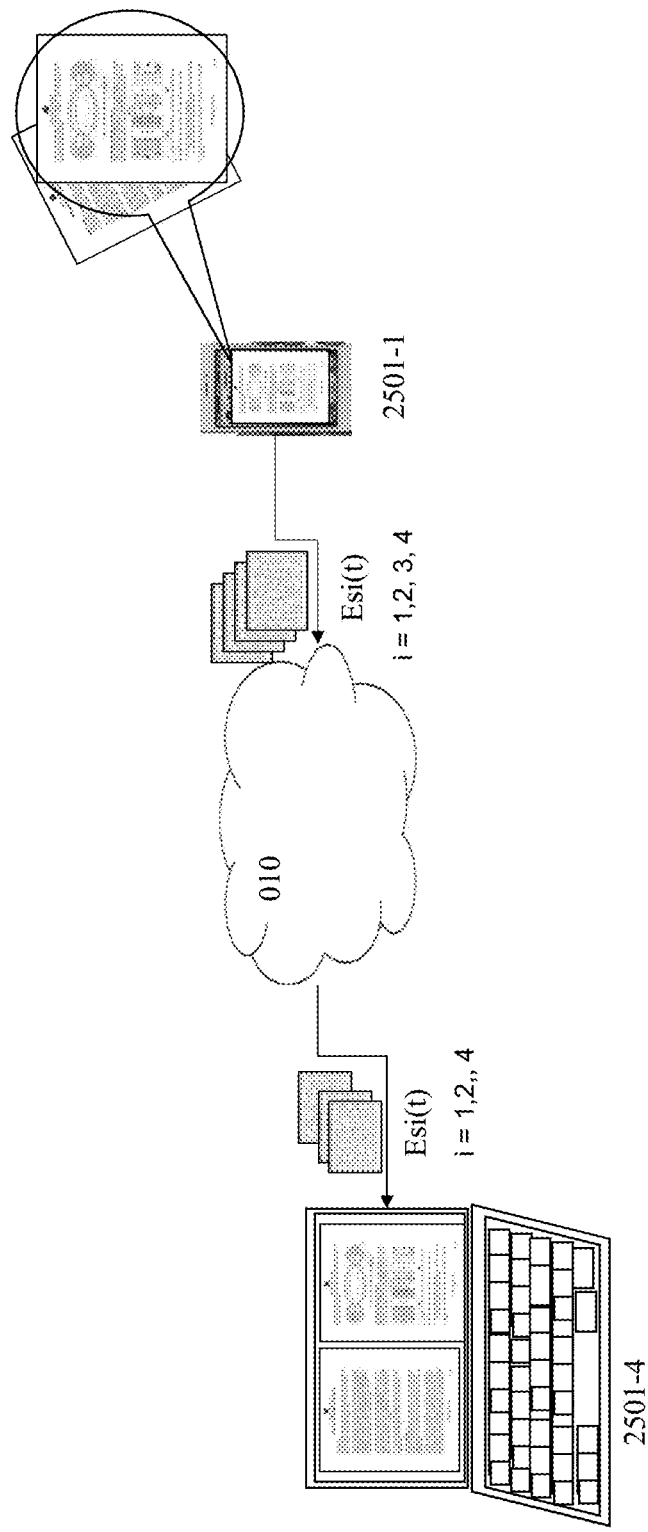
FIG. 9B illustrates a similar block diagram as that in FIG. 9A. But the data writing on distributed data storage on cloud for an image is from a mobile device or scanned documents by a smart phone via techniques of Wavefront muxing or K-muxing; and associated data reading processing in a fixed PC or a notebook via techniques of Wavefront demuxing, also known as K-demuxing in accordance of some embodiments of this invention. The cloud storage features data privacy and a 3 for 4 redundancy.

FIG. 9B depicts a functional block diagram with a reversed flowing direction from that in FIG. 9A. It shows an operation of using a mobile devices such as a smart phone 2501-1 to upload to cloud a scanned document S(t) or a data stream via 4 K-Muxed data sets (Esi where i=1 to 4). The mobile loading is in a configuration featuring K-muxed data sets in a 3 for 4 redundancy. It also shows operations of using fixed PCs or a locatable notebook 2501-4 connecting to the cloud 010 and to reconstitute the uploaded scanned document S(t) or data streams in a fixed location at a later time slot through any 3 out of the 4 cloud-stored K-Muxed data sets (Esi, where i=1, 2, 3, and 4). S(t) is a scanned document and the three selected K-Muxed files are Es1, Es2, and Es4.

Figure 9C:
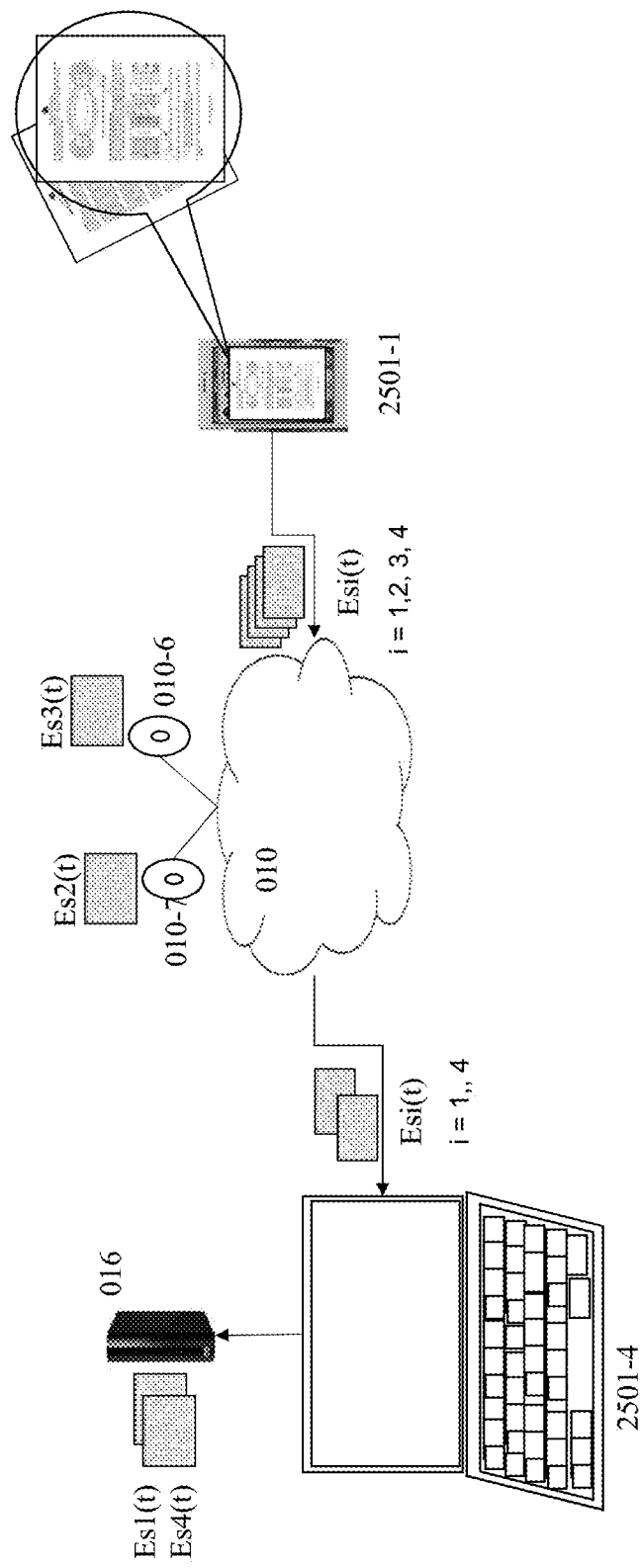
FIG. 9C illustrates a similar block diagram as that for the data writing on distributed data storage on cloud in FIG. 9B. But for an image is from a mobile device or scanned documents by a smart phone via techniques of Wavefront muxing or K-muxing; in accordance of some embodiments of this invention. The storages are distributed on cloud storages and private or personal memories. The cloud storage features data privacy and a 3 for 4 redundancy.

FIG. 9C depicts another functional block diagram similar to that in FIG. 9B. It shows an operation of using a mobile devices such as a smart phone 2501-1 to upload to cloud a scanned document S(t) or a data stream via 4 K-Muxed data sets (Esi where i=1 to 4). The mobile loading is in a configuration featuring K-muxed data sets in a 3 for 4 redundancy. However, only two of the 4 K-muxed files, $Es2(t)$, and $Es3(t)$ are stored on cloud storage 010-7 an cloud storage 010-6, the remaining two, $Es1(t)$ and $Es4(t)$, are stored in a private storage 016 connected to a user's PC 2501-4. It is so configured that the information $Es2(t)$ and $Es3(t)$ stored on cloud storage alone is not enough for reconstituting scanned document. Similarly nor there is enough information stored the on user's private storage 016 for reconstituting scanned document.

The private storage, as external hard disks or removable USB, or other configurable memory devices, may be connected to cloud through a PC or a notebook 2501-4. Utility of both storage on IP cloud 010 and those (such as the private storage 016) available to a user or an allowed community of users enables the users with limited controllability on storage. Since the depicted integrated configuration utilizes both many public clouds in the IP cloud 010 and private storages to perform distinct functions within the same user community, we shall call these configurations with public clouds in IP cloud 010 and private storages hybrid clouds. We may use the term "private cloud" to include not only commercial private IP clouds but also referring private storages belonged to individual users or those shared by a consenting user community.

For a storage configuration of a preprocessing operation using N-to-N K-Muxing with a M-for-N redundancy, there are N outputs of K-muxed files or substreams where N and M are integers, N≥4 and N≥M. One way of enhancing privacy is to place no-less than N-M+1 K-muxed files or substreams in private clouds, and the remaining muxed files are in public clouds. As an example when M=1 and N=4, an original data stream is segmented into 3 substreams which are then connected to 3 of the 4 inputs of a function of 4-to-4 K-Muxing. The $4^{th}$ input is grounded. As a result, the 4-to-4 K-muxing features a 3 for 4 redundancy in 4 output data files; or 4 K-Muxed files. We shall put on private clouds 2 K-muxed substreams, no less than 2 (4−3+1=2), and put 2 K-muxed file on public clouds.

For a 3-for-4 redundancy in stored data files, it means that we shall only require any 3 of the 4 K-Muxed files to recover the original data stream. If and when 3 K-Muxed files were put on public clouds, there would be sufficient information for reconstituting the original data stream stored on public cloud. On the other hand when only 2 of the 4 K-muxed files are put on public clouds, which comprise less than sufficient information to reconstitute the original data stream, the chance for recover the original data stream through only data on the public cloud is none.

Figure 9D:
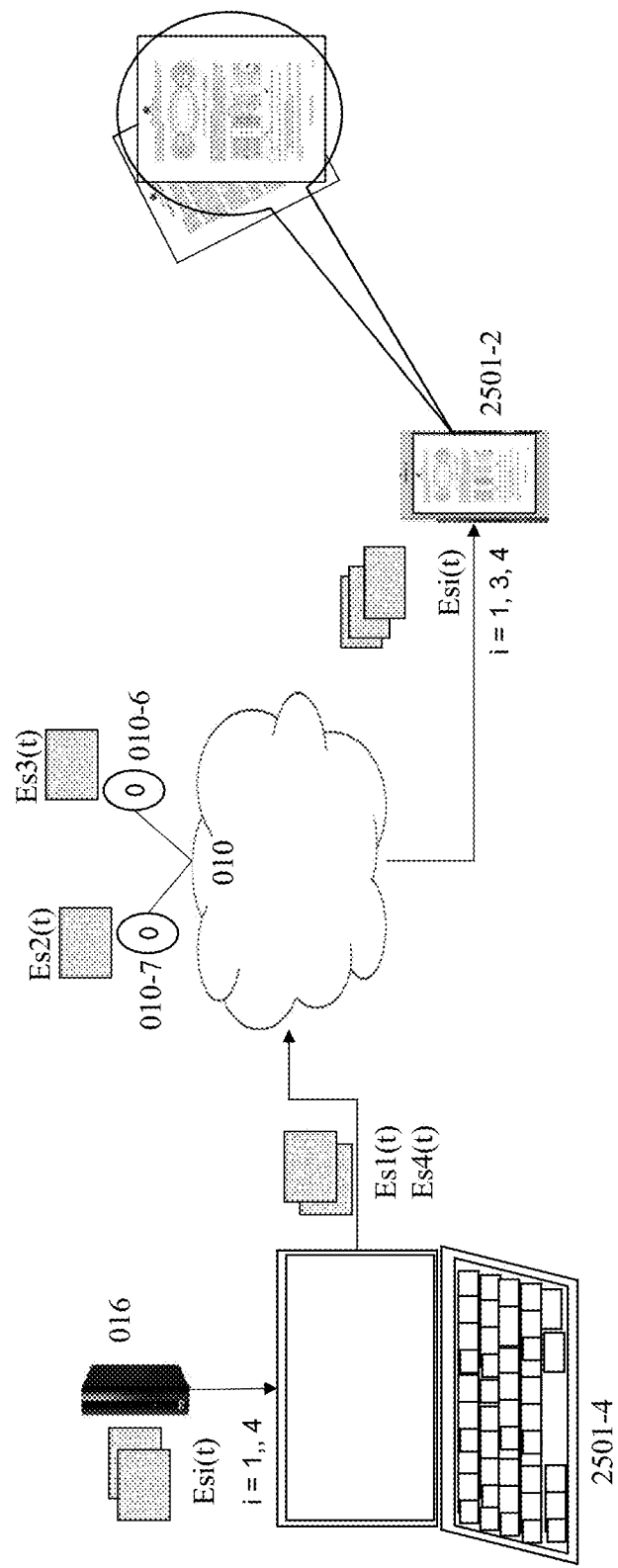
FIG. 9D illustrates a corresponding block diagram for data reading or remote accessing stored data on distributed storages as that in FIG. 9C. The associated data reading processing in a smart phone via techniques of Wavefront demuxing, also known as K-demuxing in accordance of some embodiments of this invention. The cloud storage features data privacy and a 3 for 4 redundancy.

FIG. 9D shows operations of using a mobile device such as a smart phone 2501-2 to reconstitute the uploaded scanned document S(t) or data streams by connecting the fixed PCs or a locatable notebook 2501-4 via cloud 010 for down loading $Es1(t)$ and $Es4(t)$ from a private storage 106, and concurrently connecting to the cloud 010 for down loading $Es3(t)$ from a cloud storage 010-6. It shall be sufficient to reconstitute a copy of the scanned document in a fixed location at a later time slot through any 3 out of the 4 cloud-stored K-Muxed data sets (Esi, where i=1, 2, 3, and 4). S(t) is a scanned document and the three selected K-Muxed files are Es1, Es3, and Es4.

Multiple Files Cloud Data Storage/Recovery with 3 for 4 Redundancy

Figure 10:
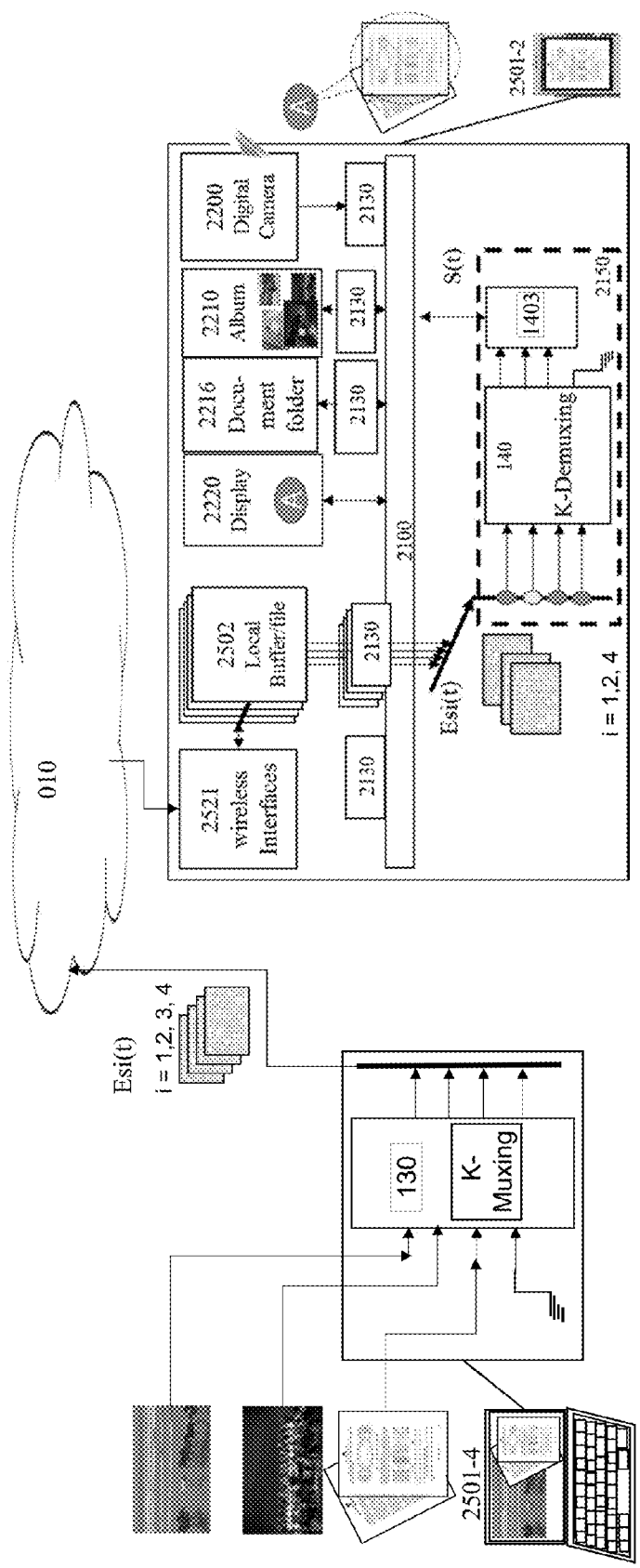
FIG. 10 depicts a block diagram of data writing on distributed data storage on cloud for three images and/or documents concurrently from a fixed PC or a notebook via techniques of Wavefront muxing or K-muxing; and associated data reading processing in a mobile device for one of the three stored images and/or documents on cloud via techniques of Wavefront demuxing, also known as K-demuxing in accordance of some embodiments of this invention. The cloud storage features data privacy and a 3 for 4 redundancy.

FIG. 10 depicts a similar functional block diagram as that in FIG. 9. The key difference is that the 3 inputs, S1, S2, and S3, to the K-muxing 130 are three independent data files or pictures instead of 3 segments from a data file or picture. As an example, two short video clips and a scanned document are selected as the 3 inputs. S1(t), the first of the three inputs, features a clip of wildlife, the second input S2 a clip of a musical recital, and the third one S3(t) a scanned document in a PDF format.

In a data storing or writing phase, the three input data streams in a notebook 2501-4 will be stored in distributed storages on cloud 010. These inputs have been preprocessed and become 4 processed or K-Muxed streams before sent to the cloud 010. Each of selected storage sites may only store one of the four K-Muxed streams, which is a linear combination of all 3 input streams and shall become unintelligible by itself. Furthermore, any one of the three inputs are stored in all 4 storages on cloud 010. As a result, the cloud storages are shared by the three input streams of two video data and one scanned document.

In a data recovering or reading phase, a set of any 3 from the 4 processed or K-Muxed data streams stored on cloud 010 shall be retrieved to a local post processing application 2150 on a second smart phone 2501-2. The post processing application 2150 comprising of K-demuxing 140 on the second smart 2501-2 is commanded to reconstitute only one of three input data streams. The K-demuxing 140 may also be commanded to recover all three original inputs; two video clips and a scanned document, by processing the retrieved set of all 3 from the 4 stored processed data streams. A dispatching device 1403 may send one of them to a display 2220 and two remaining ones to a local album 2210 or/and a document folder 2216 via API 2100 for later reviews.

Figure 10A:
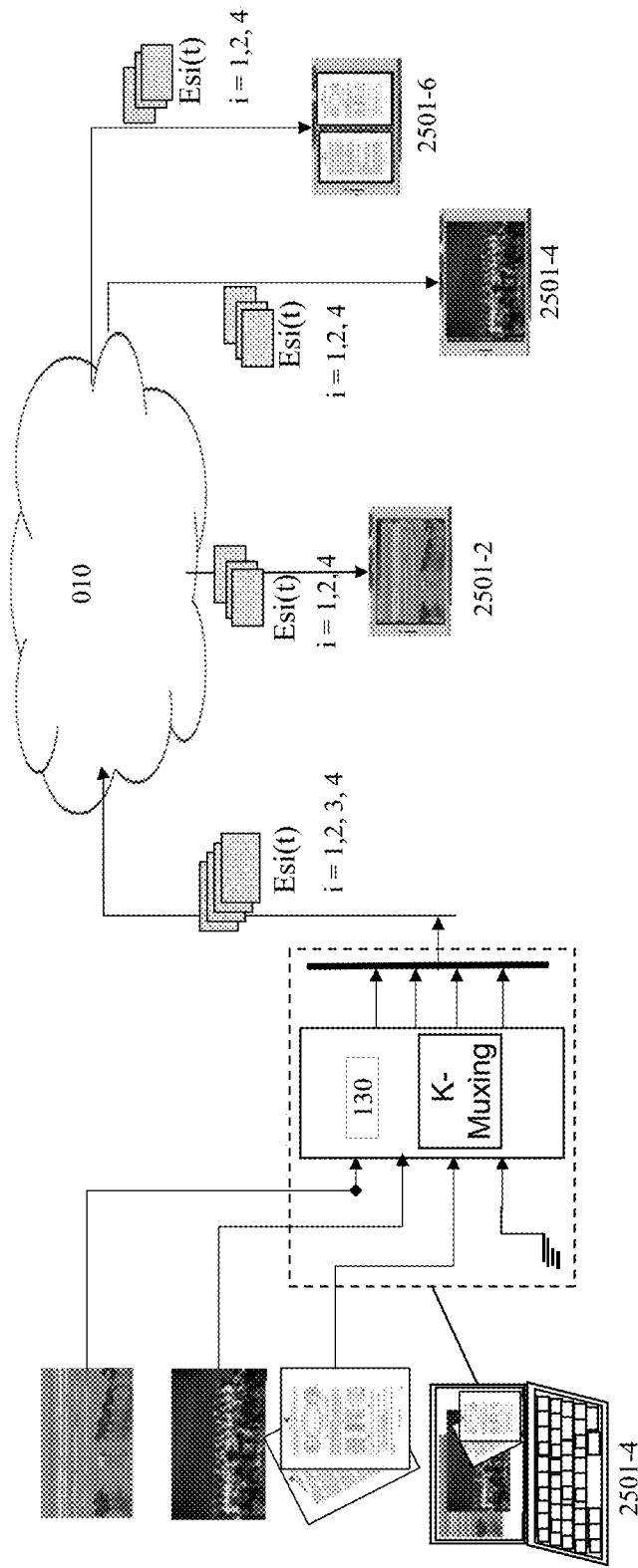
FIG. 10A depicts a simplified block diagram of data writing on distributed data storage on cloud for three images and/or documents concurrently from a fixed PC or a notebook via techniques of Wavefront muxing or K-muxing; and associated data reading processing in three separated mobile devices; each for one of the three stored images on cloud individually via techniques of Wavefront demuxing, also known as K-demuxing in accordance of some embodiments of this invention. The cloud storage features data privacy and a 3 for 4 redundancy.

FIG. 10A depicts a simplified functional block diagram as that in FIG. 10 but with more users to view different stored original data streams. The 3 original inputs, S1, S2, and S3 are 2 independent short video clips and a scanned document. S1(t) features a clip of wildlife, S2(t) a video clip on a musical recital, and S3(t) a scanned document; a trip report on China countryside.

The data recording or writing process is identical to that in FIG. 10.

There are three reading users, one with a second smart phone 2501-2, the other two with a $3^{rd}$ smart phone 2501-4 and a $4^{th}$ phone 2501-6. In a data recovering or reading phase, a set of any 3 from the 4 processed data streams stored on cloud 010 shall be retrieved to a local post processor on a second smart phone 2501-2. A K-demuxing 140 in a post processor on the second smart 2501-2 is commanded to reconstitute only the S1(t) the $1^{st}$ video data streams. Similarly in data reading phases for the $3^{rd}$ and $4^{th}$ smart phones 2501-4 and 2501-6, any 3 from the 4 processed data streams stored on cloud 010 shall be retrieved to a local post processor on a smart phone. The K-demuxing 140 in a post processor on the $3^{rd}$ smart 2501-4 is commanded to reconstitute only the S2(t) the $2^{nd}$ video data streams while that on the $4^{th}$ smart 2501-6 is commanded to reconstitute only the S3(t) a data stream the scanned document; a copy of the trip report on China countryside.

K-Muxing with Enhanced Redundancy in a Mobile Device

Figure 11:
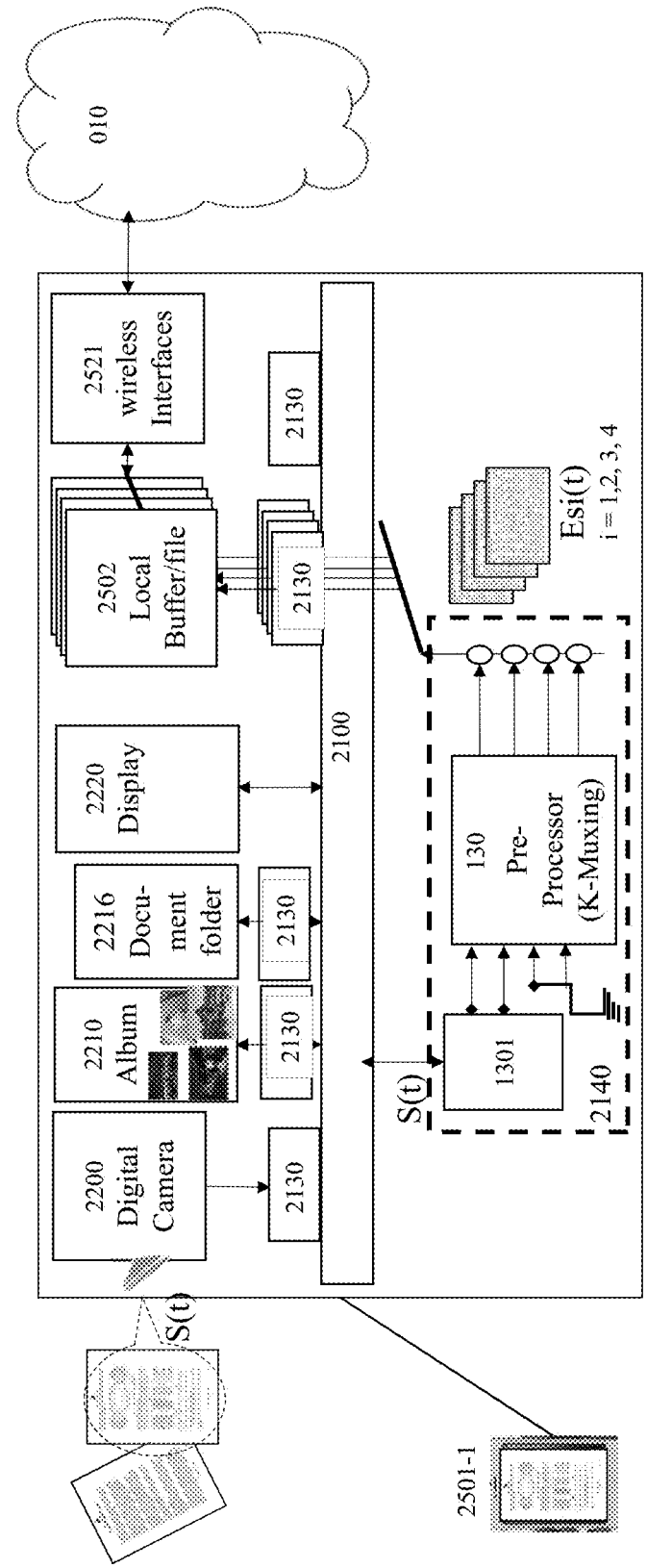
FIG. 11 depicts a block diagram of data writing on distributed data storage on cloud for a scanned document from a mobile scanning device via techniques of Wavefront muxing or K-muxing in accordance of some embodiments of this invention. The cloud storage features data privacy and a 2 for 4 redundancy.

FIG. 11 shows a software functional block diagram in a mobile device of K-muxing a data file for storage over distributed cloud storage with a 2 for 4 redundancy. The mobile device may be a smart phone 2501-1. A scanned document S(t) taken by an embedded digital camera 2200 processed in real time by one of the embedded applications 2130 and then stored in a document folder 2216 or local album 2210 is sent to a pre-processing application 2140 via an application program interface (API) 2100, before sending the associated processed data sets to cloud 010 for storage through the API 2100 and then local buffers 2302. These various local buffers 2502 are individually associated with different software of embedded applications 2130, including local file synchronization management of cloud storage such as Dropbox, Google drive, iCloud, OneDrive, and others.

The scanned document S(t) is taken from a two page trip report on China Countryside. The API 2100, a set of routines, protocols, and tools for building software applications, specifies how software components should interact and APIs are used when programming graphical user interface (GUI) components. A good API makes it easier to develop a program by providing all the building blocks. A programmer then puts the blocks together.

The preprocessing application 2140 comprises of software for segmenting 1301 which functions as a 1-to-2 TDM de-multiplexing or demuxing operation and that for K-Muxing 130 which is implemented by a 4-to-4 Hadamard matrix. The 1-to-2 TDM demuxing 1301 shall convert the data stream S(t) with a 2R samples per second into two data sub-streams, each with a flowing rate of a R samples per second. These two data substreams are then connected to 2 of the 4 inputs of the K-muxing 130 implemented by a 4-to-4 Hadamard matrix. The remaining $3^{rd}$ and $4^{th}$ inputs are grounded as shown, connected to known constants, or fed by a known digital file. Its four outputs Esi (or Es1, Es2, Es3, and Es4) are then uploaded to cloud through local buffers 2502 of various cloud storage operators. It is likely the connectivity of a mobile device such as the smart phone 2501-1 to cloud 010 is through wireless interfaces 2521 supporting WiFi links, cell phone band links, and/or others. The mobile device may also be connected to cloud services via Ethernet (not shown) or other wired connectivity or through USB transports when these non-wireless connectivity is available at home in once office, or other public facilities.

However, when a Hadamard matrix is used for the K-muxing 130 in a preprocessor, one method for generating more efficient redundancy is to follow a formulation similar to the one illustrated in equations (1-1a) to (1-8a). In a pre-storage processing, the 4-to-4 K muxing 130 is used to convert 2 sets of input data, i.e. S1(t), and S2(t) to 4 sets of output data, i.e. D1, D2, D3, and D4, where:

$$D1=S1(t)+S2(t)+f1(t)+f2(t) \qquad (8\text{-}1)$$

$$D2=S1(t)-S2(t)+f1(t)-f2(t) \qquad (8\text{-}2)$$

$$D3=S1(t)+S2(t)-f1(t)-f2(t) \qquad (8\text{-}3)$$

$$D4=S1(t)-S2(t)-f1(t)+f2(t) \qquad (8\text{-}4)$$

A 4-to-4 Hadamard matrix HM, in which all elements are "1" or "−1" is chosen for the 4-to-4 K-muxing. A 4-to-4 K-muxing may be implemented by other orthogonal matrix such as Fourier Transform or any 4×4 full rank matrixes with realizable inversed matrixes. A 4-to-4 K-muxing may also be implemented by other 4×4 full rank non-orthogonal matrix with realizable inversed matrixes. Equations (5-1) to (5-4) can be written in a matrix form as $$D = HM * S \quad (6)$$

$$\text{where: } D = [D1, D2, D3, D4]^T \quad (6\text{-}1)$$

$$HM = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (6\text{-}2)$$

$$S = [S1(t), S2(t), f1(t), f2(t)]^T \quad (8\text{-}5)$$

We may choose many sets of functions which are related to both S(t) and S(t). The following choice appears to work well;

$$f1 = S1 + 2*S2 + 0 \quad (9a)$$

$$f2 = 0 \quad (9b)$$

K-Demuxing with Enhanced Redundancy in a Mobile Device

Figure 12:
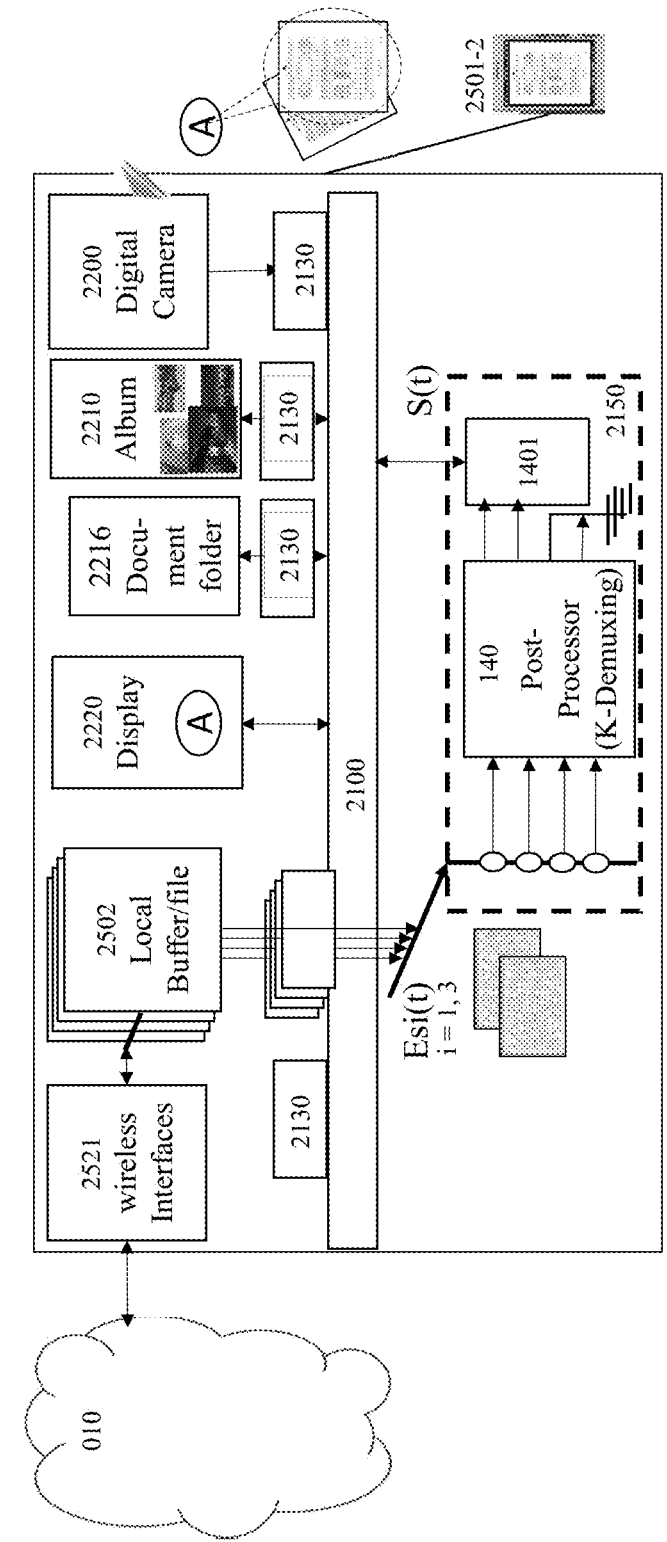
FIG. 12 depicts a block diagram of data reading from distributed data storage on cloud via techniques of Wavefront demuxing or K-demuxing in accordance of some embodiments of this invention. The cloud storage features data privacy and a 2 for 4 redundancy.

FIG. 12 shows a software functional block diagram in a mobile device for recovering a stored scanned document or digital streams by K-demuxing a set of K-Muxed data substreams stored over distributed cloud storage with a 2 for 4 redundancy. The mobile device may be a smart phone 2501-2. Four sets of cloud stored substreams are requested and sent from cloud 010 to various local buffers 2502 via wireless interface 2521. Different applications 2300 associated the various local buffers 2502 include local file synchronization management of cloud storage such as Dropbox, Google drive, iCloud, OneDrive, and others. WE only need 3 out of the 4 stored data substreams. These retrieved muxed data substreams Esi(t) including Es1, Es2, Es3, and/or Es4 are sent through API 2100 to a post-processing application 2150 which shall recover the stored scanned document S(t) or data streams.

The post-processing application 2150 comprises of software for a 4-to-4 K-demuxing 140 which is implemented by a 4-to-4 Hadamard matrix and that for de-segmenting 1401 which functions as a 2-to-1 TDM multiplexing or muxing operation.

When all 4 inputs of the 4-to-4 K-demuxing 140 are connected to 4 retrieved K-Muxed data substreams Esi(t) and the 4 outputs shall be two known outputs and the 2 recovered data substreams which are then connected to the de-segmenting processor 1401. The 1-to-2 TDM muxing for the de-segmenting 1401 shall convert the 2 recovered data substreams S1 and S2 to a scanned document S(t). Each of the two substreams features a flow rate at R samples per second, while the reconstituted data stream; the scanned document, shall feature a flow rate at 2R samples per second.

On the other hand, when 2 of 4 inputs of the 4-to-4 K-demuxing 140 are connected to only 2 retrieved muxed data substreams Esi(t), say Es1(t) and Es3(t) only, and the 2 outputs from the K-demuxing 140 shall be the 2 recovered data substreams which are then connected to the de-segmenting processor 1401. The 1-to-2 TDM muxing for the de-segmenting 1401 shall convert the 2 recovered data substreams S1 and S2; each with a flow rate at R samples per second into a reconstituted data stream with a flowing rate of a 2R samples per second. For an advanced subscriber, the recovered S1(t) and S2(t) shall be used to regenerate Es2(t) and Es4(t) and then to request for updating the previously unavailable data stored on cloud 010.

The reconstituted copy of the scanned document S(t) is then sent via the API 2100 for presentation by a display 2220 in the mobile device 2501-2. The reconstituted copy of the scanned document S(t), or digital streams, may also be sent to Album 2210 or to a document folder 2216 for storage via various applications through the API 2100.

Cloud Data Storage/Recovery with 2 for 4 Redundancy

Figure 13:
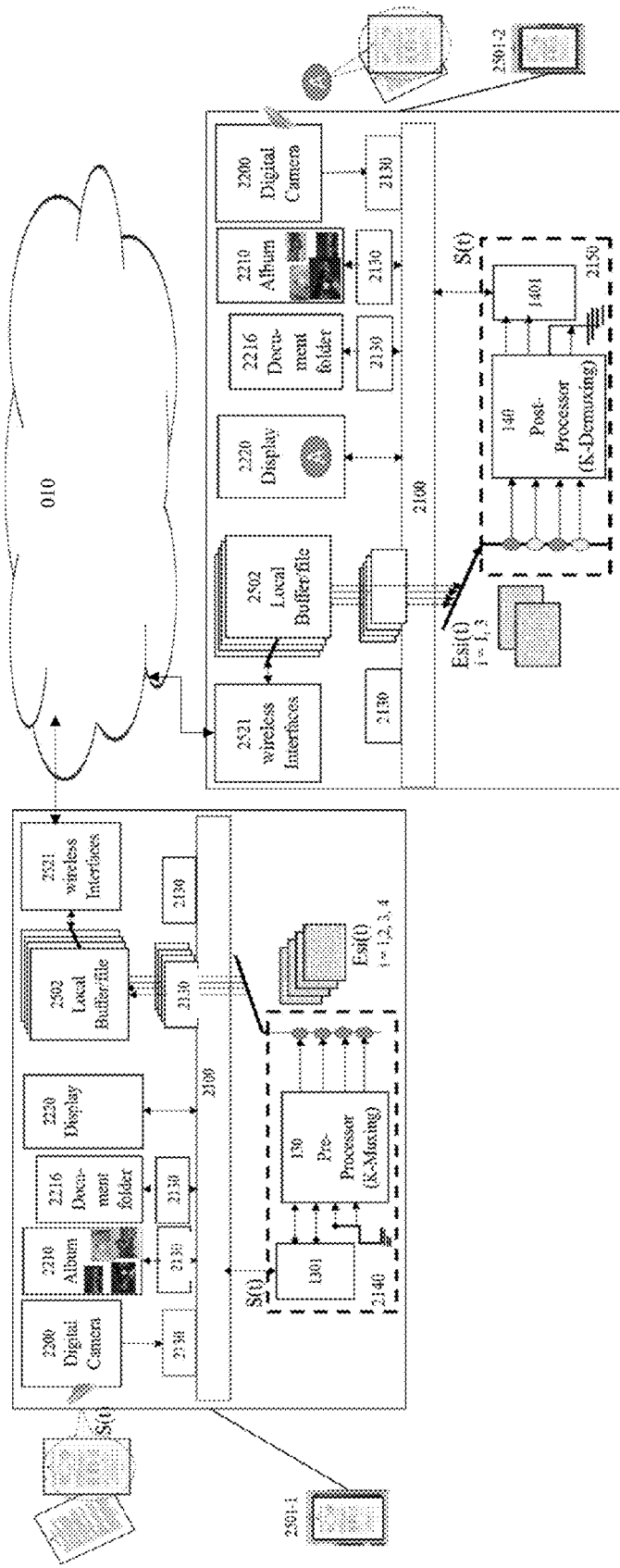
FIG. 13 depicts a block diagram of data writing on distributed data storage on cloud for a scanned document from a mobile device via techniques of Wavefront muxing or K-muxing, and data reading from distributed data storage on cloud via techniques of Wavefront demuxing or K-demuxing in accordance of some embodiments of this invention. The cloud storage features data privacy and a 2 for 4 redundancy.

FIG. 13 depict a top level functional block diagram for private data storage on cloud 010 with enhanced survivability. In a data storing or writing phase, a scanned document or data streams in a first smart phone 2501-1 will be sent and stored in distributed storages on cloud 010. The scanned document has been preprocessed and becomes 4 processed segments or K-Muxed substreams before being sent to the cloud 010.

In a data recovering or reading phase, a set of any 2 from the 4 processed segments or substreams stored on cloud shall be retrieved to a local post processing application 2150 on a second smart phone 2501-2. The post processing application on the second smart 2501-2 will reconstitute a copy of the scanned document or the data stream by processing the retrieved any set of 2 from the 4 processed segments or K-Muxed substreams.

The preprocessing application 2140 comprises of K-muxing 130, and may also feature erasure coding and encryptions or similar functions before sending processed data to cloud. The corresponding post-processing application 2150 comprises of K-demuxing 140, and may also feature erasure-code decoding and decryptions or similar functions after retrieving all cloud-stored data from the cloud 010.

It is important to point out that cloud stored data preprocessed by the K-muxing 130 in FIG. 3 or that in FIG. 6 will not be useful at all for a post processing of the K-demuxing 140 depicted in FIG. 12 or in here. Similarly, cloud stored data preprocessed by the K-muxing 130 in FIG. 12 or here will not be useful at all for a post processing of the K-demuxing 140 depicted in FIG. 4 and that in FIG. 7. It is noticed that the functions of the K-muxing 130 in FIG. 3, FIG. 6, FIG. 11, and that in here are identical and featuring a 4-to-4 Hadamard transform. Similarly, the functions of K-demuxing 140 in FIG. 4, FIG. 7, FIG. 12 and here also feature the same 4-to-4 Hadamard transform.

This is because the 4 data inputs to the K-muxing 130 in FIG. 3 are very different from those in FIG. 6, FIG. 11, or here. The former features a set of 4 data segments or data substreams in FIG. 3 while only 3 or 2 data segments are connected to 3 or 2 of the 4 inputs of the K-muxing 130 in FIG. 6 or FIG. 1. In many configurations, the remaining last inputs are connected not to data to be stored but to one known input signal. In fact the remaining input is grounded, effectively connected to a known signal always set at zero value.

Figure 13A:
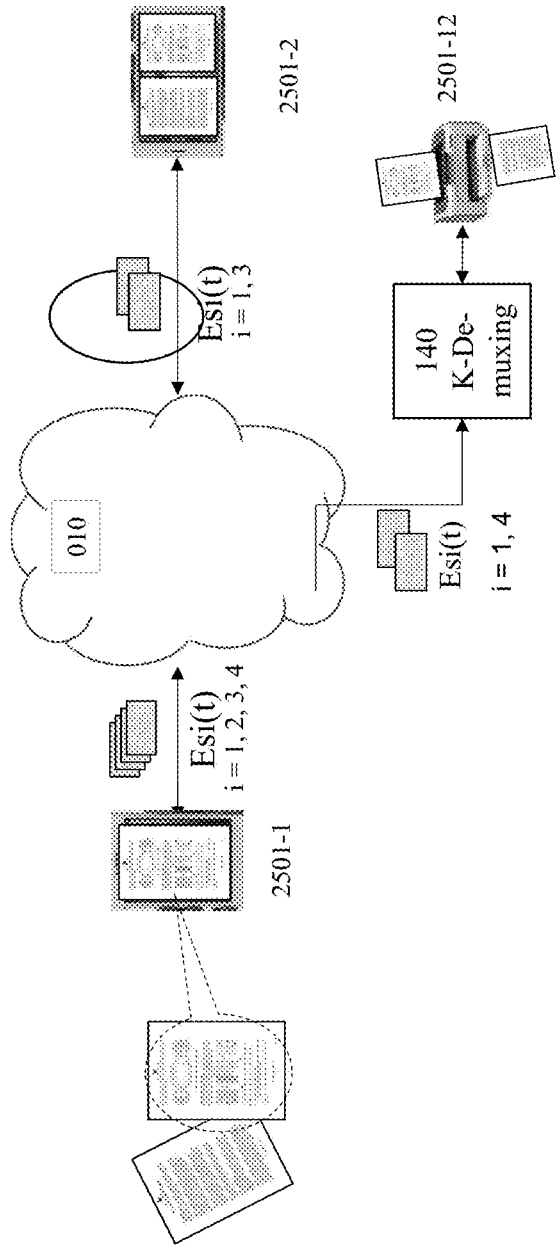
FIG. 13A depicts a simplified block diagram of data writing and reading on cloud in accordance of some embodiments of this invention; similar to that shown in FIG. 13.

FIG. 13A depict a top level functional block diagram for cloud storage techniques for private data storage on cloud 010 with enhanced survivability and is a simplified version of FIG. 13. In a data storing or writing phase, a scanned document or a data stream in a first smart phone 2501-1 will be stored in distributed storages on cloud 010. The scanned document has been preprocessed and becomes 4 processed segments or K-Muxed substreams before being sent to the cloud 010. The preprocessing application features two operations; (1) segmenting an input data set or a data stream into two data segments or 2 data substreams, and then converting the two inputs via a K-muxing into 4 K-Muxed files for storage on cloud.

In a data recovering or reading phase, a set of any 2 from the 4 processed segments or K-Muxed substreams stored on cloud shall be retrieved to a local post processor on a second smart phone 2501-2. The post processing application on the second smart 2501-2 will reconstitute the scanned document or the data stream by processing the retrieved set of all 2 from the 4 processed segments or K-Muxed substreams. Depicted in here the retrieved K-Muxed substreams are $Es1(t)$ and $Es3(t.)$.

A first smart phone 2501-1 and a $2^{nd}$ mart phone 2501-2 may be the same smart phone but referred to in different time slots.

A remote printing is shown in the lower right-hand side. In the data recovering or reading phase, a set of any 2 from the 4 processed segments or K-Muxed substreams stored on cloud 010 are retrieved to a local post processor on a remote smart printer or a in a separated dongle before a printer 2501-12 as depicted in here. The post processing application shall feature function of K-Demuxing 140 will reconstitute the scanned document or the data stream by processing the retrieved set of all 2 from the 4 processed segments or K-Muxed substreams. Depicted in here the retrieved K-Muxed substreams are $Es1(t)$ and $Es4(t.)$.

Figure 14:
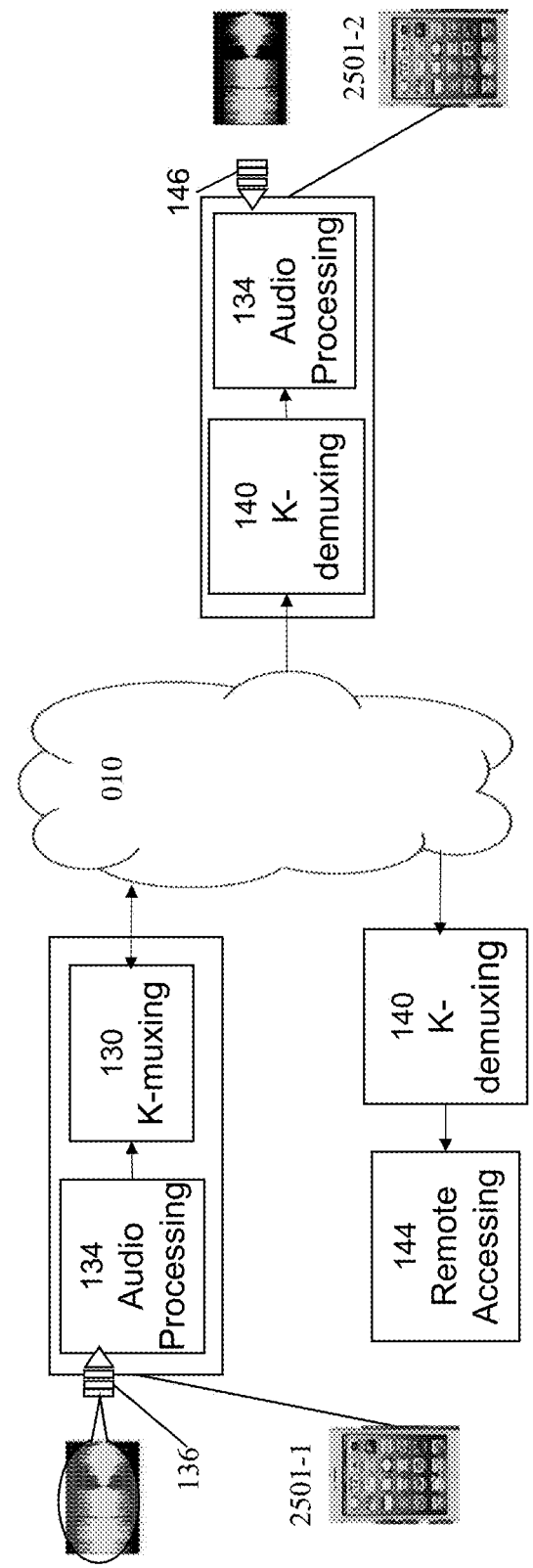
FIG. 14 depicts a simplified functional flow diagram of mobile voice messages and/or recorded audios stored on cloud and remote accessing for the private voice messages/audios on distributed cloud data storage in accordance of some embodiments of this invention.

FIG. 14 depicts a functional flow diagram of mobile voice messaging for private data cloud storage, and remote accessing for the private voice message stored on various distributed cloud data sites in accordance of some embodiments of this invention. The messaging may be used for storing any audio files. A clip of voice or an audio file from a user is received via a transponding device such as a microphone 136 by an application of audio processing 134 for mobile voice messaging or audio recording in a first smart phone 2501-1. In addition, the received voice message clip is digitized in the audio processing 134 becoming a digital audio file, which is then further processed via K-muxing 130 in the first smart phone 2501-1; segmenting the documents into N-pieces and transforming the N-segments to N-K-muxed files which will then be sent and stored individually in storages distributed on cloud 010 for later usage. Audio files to be recorded on cloud may also come not through the microphone 136 but via other interfaces which are not shown in here.

Let us assume that N=16 again. Furthermore, we have configured the K-muxing 130 to feature a 14-for-16 redundancy in the K-muxed and then cloud-stored data. To reconstitute a copy of original digital audio file in a remote accessing, only 14 out of the 16 stored K-muxed files are required.

In a remote accessing site, 15 of the 16 individually stored K-muxed files on cloud is available. With 15 available but only 14 required on stored muxed files, we shall have 15 different sets of choices in recovering the original recorded voice message or audio files via a corresponding K-demuxing 140; thus 15 versions of the recovered digital audio files are generated. When there are no contaminations in any storages on cloud, the 15 copies shall be identical, and can be converted and played by a speaker 146 in an audio processing 134 in a second smart phone 2501-2. The cloud stored voice clip or audio file may be retrieved by a third device or stored locally via applications with remote accessing 144 on the third device.

K-Muxing Voice Files in a Mobile Device with Privacy but No Redundancy

Figure 14A:
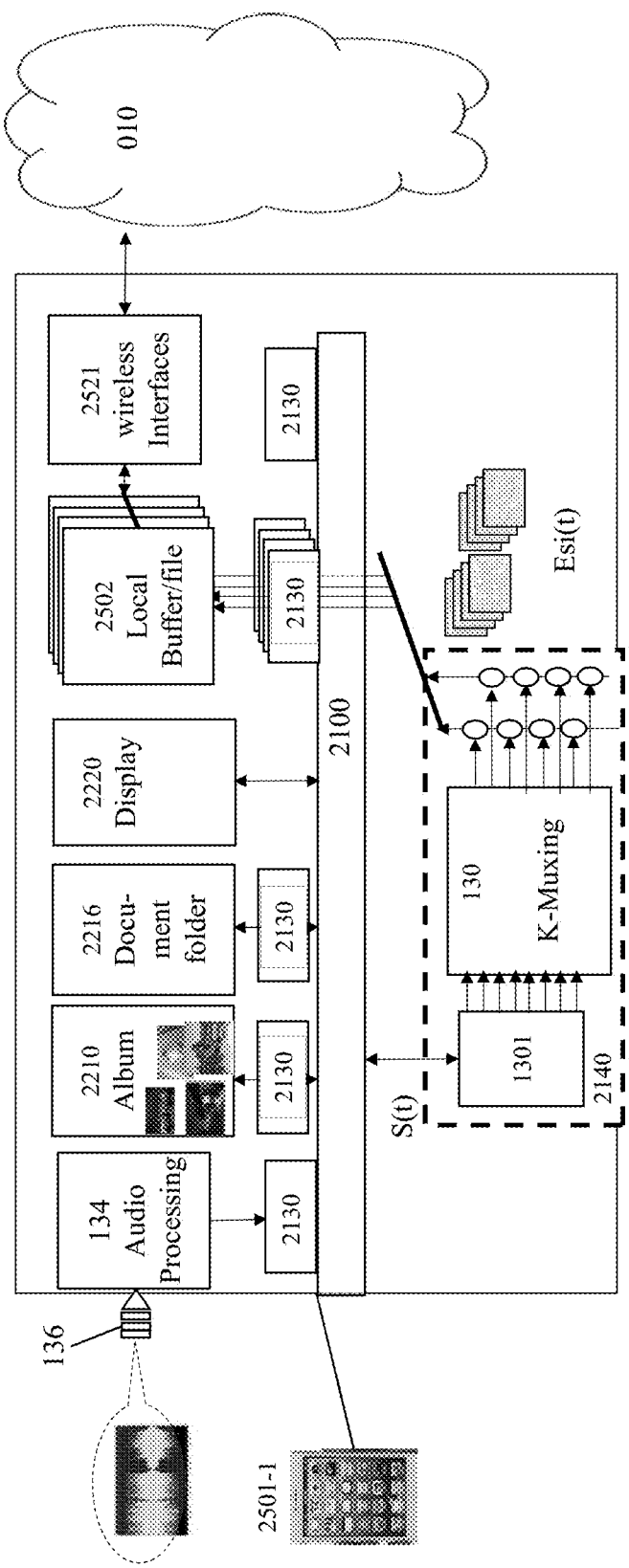
FIG. 14A depicts a functional flow diagram with 8-to-8 K-Muxing of mobile voice messages and/or recorded audios to be stored on cloud in accordance of some embodiments of this invention.

FIG. 14A shows a software functional block diagram in a mobile device with functions of K-muxing on a voice data file for storage over distributed cloud storage without redundancy. The mobile device may be a smart phone 2501-1. An input signal $S(t)$; a voice clip taken by an operation of audio processing 134 in real time through one of the embedded applications 2130 or a stream of digital voice stored in the document folder 2216 is sent to a pre-processor 2140 before being sent for cloud storage as primary storage sites or backup storages. $S(t)$ shall be sent to the pre-processing application 2140 via an application program interface (API) 2100. The associated processed data sets are then sent to cloud 010 for storage through the API 2100 and then local buffers 2302. These various local buffers 2502 are individually associated with different software of the embedded applications 2130, including local file synchronization management of cloud storage such as Dropbox, Google drive, iCloud, OneDrive, and others.

The $S(t)$ features a stream of digitized voice. The API 2100, a set of routines, protocols, and tools for building software applications, specifies how software components should interact and APIs are used when programming graphical user interface (GUI) components. A good API makes it easier to develop a program by providing all the building blocks. A programmer then puts the blocks together.

The preprocessing application 2140 comprises of software for segmenting 1301 which functions as a 1-to-8 TDM de-multiplexing or demuxing operation and that for K-Muxing 130 which is implemented by an 8-to-8 Hadamard matrix. The 1-to-8 TDM demuxing 1301 shall convert the data stream $S(t)$ with a 8R samples per second into eight data sub-streams, each with a flowing rate of a R samples per second. The K-muxing may function in a mode of sample-to-sample operation, or a mode with block to block operation. For illustrations, we shall focus the operation in a mode of sample-to-sample.

These eight data substreams are then connected to the 8 inputs of the K-muxing 130 implemented by an 8-to-8 Hadamard matrix. Its eight outputs Esi (where i=1 to 8) are then uploaded to cloud through local buffers 2502 of various cloud storage operators. It is likely the connectivity of a mobile device such as the smart phone 2501-1 to cloud 010 is through wireless interfaces 2521 supporting WiFi links, cell phone band links, and/or others. The mobile device may also be connected to cloud services via Ethernet (not shown) or other wired connectivity or through USB transports when these non-wireless connectivity is available at home in once office, or other public facilities.

The eight outputs Esi (where i=1 to 8) are the K-Muxed files. Individually, each is a weighted sum of all eight inputs featuring un-intelligible noises comprising of aggregated voices. For retrieving the original voice stream from the stored data files on cloud, an operation corresponding K-demuxing is not shown. All 8 K-muxed files, Esi and i=1 to 8, are needed. There is no redundancy. Any one of the 8-files is missing or distorted, the original voice stream cannot be re-produced.

Figure 14B:
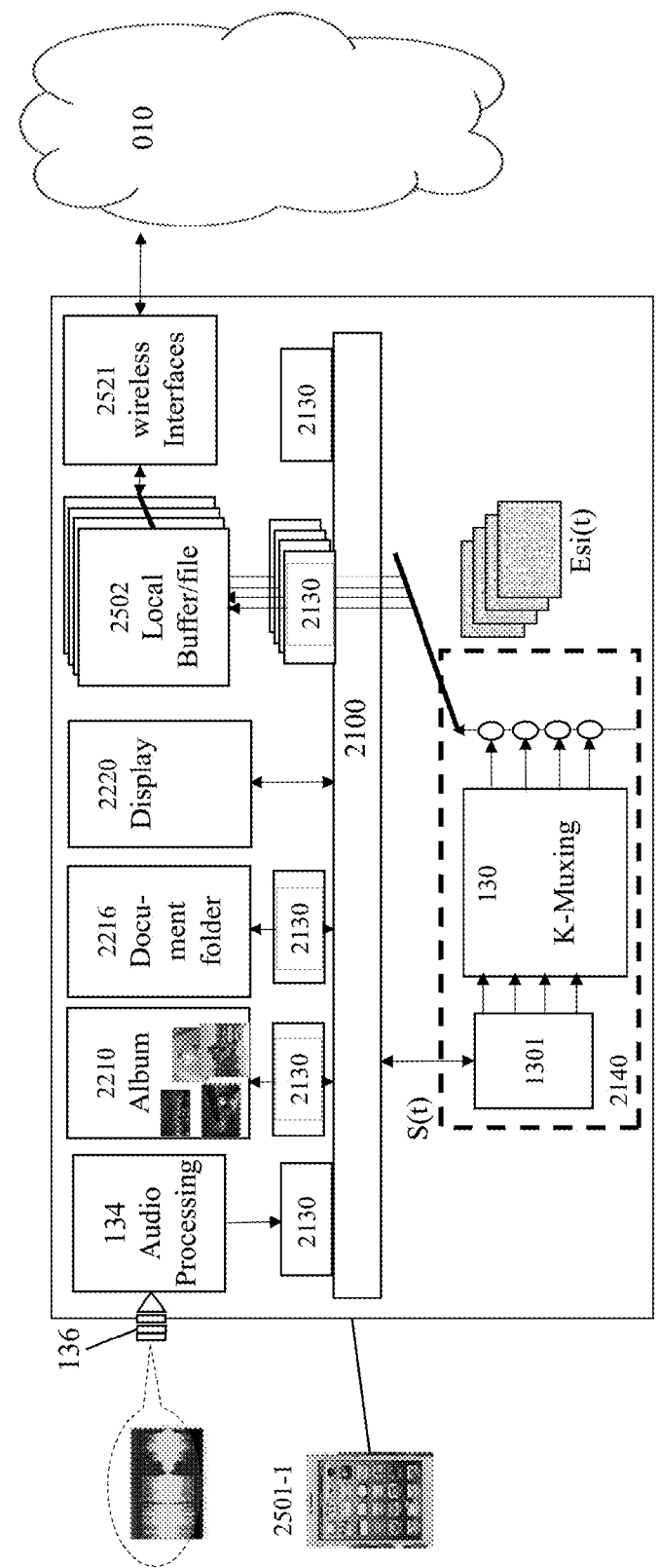
FIG. 14B depicts a functional flow diagram with 4-to-4 K-Muxing of mobile voice messages and/or recorded audios to be stored on cloud in accordance of some embodiments of this invention.

FIG. 14B shows a software functional block diagram in a mobile device with a function of 4-to-4 K-muxing 130 on a voice data file for storage over distributed cloud storage with privacy but without redundancy. The mobile device may be a smart phone 2501-1. An input signal $S(t)$; a voice clip taken by an operation of audio processing 134 in real time through one of the embedded applications 2130 or a stream of digital voice stored in the document folder 2216 is sent to a pre-processor 2140 before being sent for cloud storage as primary storage sites or backup storages. $S(t)$ shall be sent to the pre-processing application 2140 via an application program interface (API) 2100. The associated processed data sets are then sent to cloud 010 for storage through the API 2100 and then local buffers 2302. These various local buffers 2502 are individually associated with different software of the embedded applications 2130, including local file synchronization management of cloud storage such as Dropbox, Google drive, iCloud, OneDrive, and others.

The S(t) features a stream of digitized voice. The API 2100, a set of routines, protocols, and tools for building software applications, specifies how software components should interact and APIs are used when programming graphical user interface (GUI) components. A good API makes it easier to develop a program by providing all the building blocks. A programmer then puts the blocks together.

The preprocessing application 2140 comprises of software for segmenting 1301 which functions as a 1-to-4 TDM de-multiplexing or demuxing operation and that for K-Muxing 130 which is implemented by a 4-to-4 Hadamard matrix. The 1-to-4 TDM demuxing 1301 shall convert the data stream S(t) with a 4R samples per second into 4 data sub-streams, each with a flowing rate of a R samples per second. The K-muxing 130 may function in a mode of sample-to-sample operation, or a mode with block to block operation. For illustrations, we shall focus the operation in a mode of sample-to-sample.

These 4 data substreams are then connected to the 4 inputs of the K-muxing 130 implemented by a 4-to-4 Hadamard matrix. Its 4 outputs Esi (where i=1 to 4) are then uploaded to cloud through local buffers 2502 of various cloud storage operators. It is likely the connectivity of a mobile device such as the smart phone 2501-1 to cloud 010 is through wireless interfaces 2521 supporting WiFi links, cell phone band links, and/or others. The mobile device may also be connected to cloud services via Ethernet (not shown) or other wired connectivity or through USB transports when these non-wireless connectivity is available at home in once office, or other public facilities.

The 4 outputs Esi (where i=1 to 4) are the K-Muxed files. Individually, each is a weighted sum of all 4 inputs featuring un-intelligible noises comprising of aggregated voices. For retrieving the original voice stream from the stored data files on cloud, an operation corresponding K-demuxing is not shown. All 8 K-muxed files, Esi and i=1 to 8, are needed. There is no redundancy. Any one of the 8-files is missing or distorted, the original voice stream cannot be re-produced.

K-Muxing Voice Files in a Mobile Device with Privacy and Redundancy

Figure 14C:
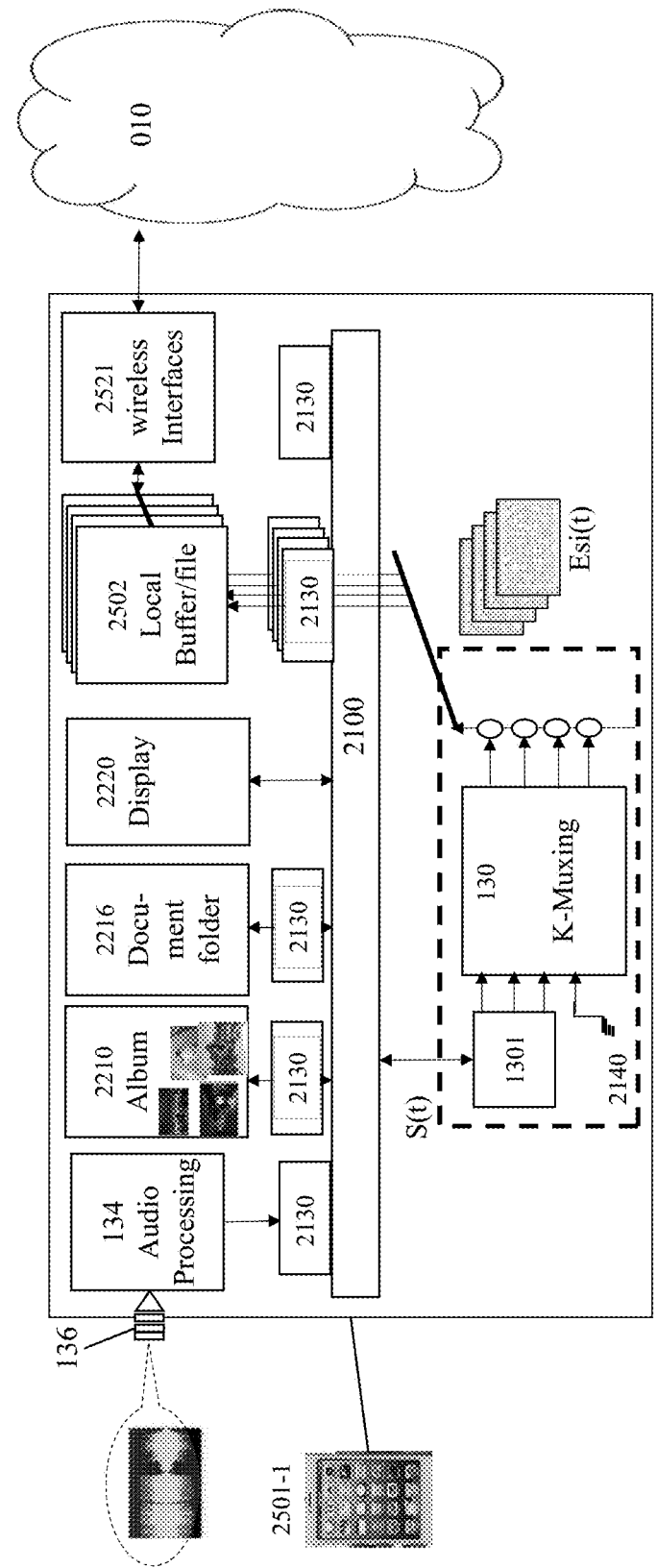
FIG. 14C depicts another functional flow diagram with 4-to-4 K-Muxing of mobile voice messages and/or recorded audios to be stored on cloud in accordance of some embodiments of this invention.

FIG. 14C shows a software functional block diagram in a mobile device with a function of 4-to-4 K-muxing 130 on a voice data file for storage over distributed cloud storage with privacy and redundancy. The mobile device may be a smart phone 2501-1. An input signal S(t); a voice clip taken by an operation of audio processing 134 in real time through one of the embedded applications 2130 or a stream of digital voice stored in the document folder 2216 is sent to a pre-processor 2140 before being sent for cloud storage as primary storage sites or backup storages. S(t) shall be sent to the pre-processing application 2140 via an application program interface (API) 2100. The associated processed data sets are then sent to cloud 010 for storage through the API 2100 and then local buffers 2302. These various local buffers 2502 are individually associated with different software of the embedded applications 2130, including local file synchronization management of cloud storage such as Dropbox, Google drive, iCloud, OneDrive, and others.

The S(t) features a stream of digitized voice. The API 2100, a set of routines, protocols, and tools for building software applications, specifies how software components should interact and APIs are used when programming graphical user interface (GUI) components. A good API makes it easier to develop a program by providing all the building blocks. A programmer then puts the blocks together.

The preprocessing application 2140 comprises of software for segmenting 1301 which functions as a 1-to-3 TDM de-multiplexing or demuxing operation and that for K-Muxing 130 which is implemented by a 4-to-4 Hadamard matrix. The 1-to-3 TDM demuxing 1301 shall convert the data stream S(t) with a 3R samples per second into 3 data sub-streams, each with a flowing rate of a R samples per second. The K-muxing 130 may function in a mode of sample-to-sample operation, or a mode with block to block operation. For illustrations, we shall focus the operation in a mode of sample-to-sample.

These 3 data substreams are then connected to 3 of the 4 inputs of the K-muxing 130 implemented by a 4-to-4 Hadamard matrix. The remaining input port is then connected to ground. The 4 outputs Esi (where i=1 to 4) from the K-muxing 130 are then uploaded to cloud through local buffers 2502 of various cloud storage operators. It is likely the connectivity of a mobile device such as the smart phone 2501-1 to cloud 010 is through wireless interfaces 2521 supporting WiFi links, cell phone band links, and/or others. The mobile device may also be connected to cloud services via Ethernet (not shown) or other wired connectivity or through USB transports when these non-wireless connectivity is available at home in once office, or other public facilities.

The 4 outputs Esi (where i=1 to 4) are the K-Muxed files. Individually, each is a weighted sum of all 3 inputs featuring un-intelligible noises comprising of aggregated voices. For retrieving the original voice stream from the stored data files on cloud, an operation corresponding K-demuxing is not shown. Any 3 from the 4 K-muxed files, Esi and i=1 to 4, are needed. There is one redundancy in all 4 storages. Any one of the 4-files is missing or distorted, the original voice stream can still be re-produced.

K-Muxing Voice Files in a Mobile Device with Selectable Privacy and Redundancy

Figure 14D:
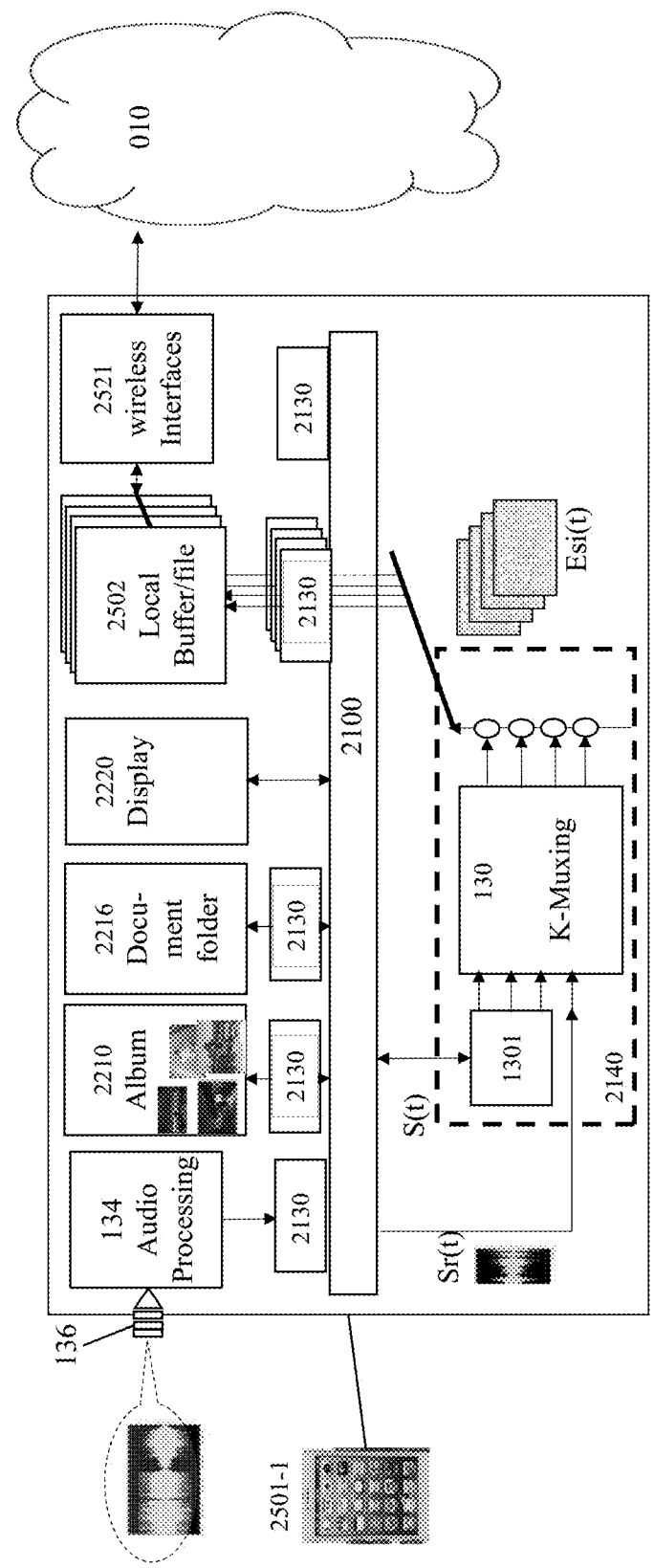
FIG. 14D depicts a different functional flow diagram with 4-to-4 K-Muxing of mobile voice messages and/or recorded audios to be stored on cloud in accordance of some embodiments of this invention.

FIG. 14D shows a software functional block diagram in a mobile device with a function of 4-to-4 K-muxing 130 on a voice data file for storage over distributed cloud storage with selectable privacy and redundancy. The mobile device may be a smart phone 2501-1. An input signal S(t); a voice clip taken by an operation of audio processing 134 in real time through one of the embedded applications 2130 or a stream of digital voice stored in the document folder 2216 is sent to a pre-processor 2140 before being sent for cloud storage as primary storage sites or backup storages. S(t) shall be sent to the pre-processing application 2140 via an application program interface (API) 2100. The associated processed data sets are then sent to cloud 010 for storage through the API 2100 and then local buffers 2302. These various local buffers 2502 are individually associated with different software of the embedded applications 2130, including local file synchronization management of cloud storage such as Dropbox, Google drive, iCloud, OneDrive, and others.

The S(t) features a stream of digitized voice. The API 2100, a set of routines, protocols, and tools for building software applications, specifies how software components should interact and APIs are used when programming graphical user interface (GUI) components. A good API makes it easier to develop a program by providing all the building blocks. A programmer then puts the blocks together.

The preprocessing application 2140 comprises of software for segmenting 1301 which functions as a 1-to-3 TDM de-multiplexing or demuxing operation and that for K-Muxing 130 which is implemented by a 4-to-4 Hadamard matrix. The 1-to-3 TDM demuxing 1301 shall convert the data stream S(t) with a 3R samples per second into 3 data sub-streams, each with a flowing rate of a R samples per second. The K-muxing 130 may function in a mode of sample-to-sample operation, or a mode with block-to-block operation. For illustrations, we shall focus the operation in a mode of sample-to-sample.

These 3 data substreams are then connected to 3 of the 4 inputs of the K-muxing 130 implemented by a 4-to-4 Hadamard matrix. The remaining input port is then connected to a second sound signals Sr(t). The 4 outputs Esi (where i=1 to 4) from the K-muxing 130 are then uploaded to cloud through local buffers 2502 of various cloud storage operators. It is likely the connectivity of a mobile device such as the smart phone 2501-1 to cloud 010 is through wireless interfaces 2521 supporting WiFi links, cell phone band links, and/or others. The mobile device may also be connected to cloud services via Ethernet (not shown) or other wired connectivity or through USB transports when these non-wireless connectivity is available at home in once office, or other public facilities.

The 4 outputs Esi (where i=1 to 4) are the K-Muxed files. Individually, each is a weighted sum of all 4 inputs (3 segmented files S1, S2, and S3 from the first voice signal S(t) and the second voice Sr(t) known to a first group of users), featuring un-intelligible noises comprising of aggregated voices of S1(t), S2(t), S3(t) and Sr(t).

For retrieving the original voice stream from the stored data files on cloud for the first group of users, an operation corresponding K-demuxing is not shown. Users in the first group do have the access of known digital voice file Sr(t), any 3 from the 4 K-muxed files, Esi and i=1 to 4, are sufficient to reconstruct S(t). There is one redundancy in all 4 storages. Any one of the 4-files is missing or distorted, the original voice stream can still be re-produced.

For users not in the first group of users to retrieve the original voice stream from the stored data files on cloud, an operation corresponding K-demuxing is not shown. Users other than those in the first group do not have the access of known digital voice file Sr(t), all 4 K-muxed files, Esi and i=1 to 4, are needed to reconstruct S(t). There is no redundancy in stored data. Any one of the 4-files is missing or distorted, the original voice stream cannot be re-produced at all.

K-Muxing Voice Files in a Mobile Device with Privacy without Redundancy

Figure 14E:
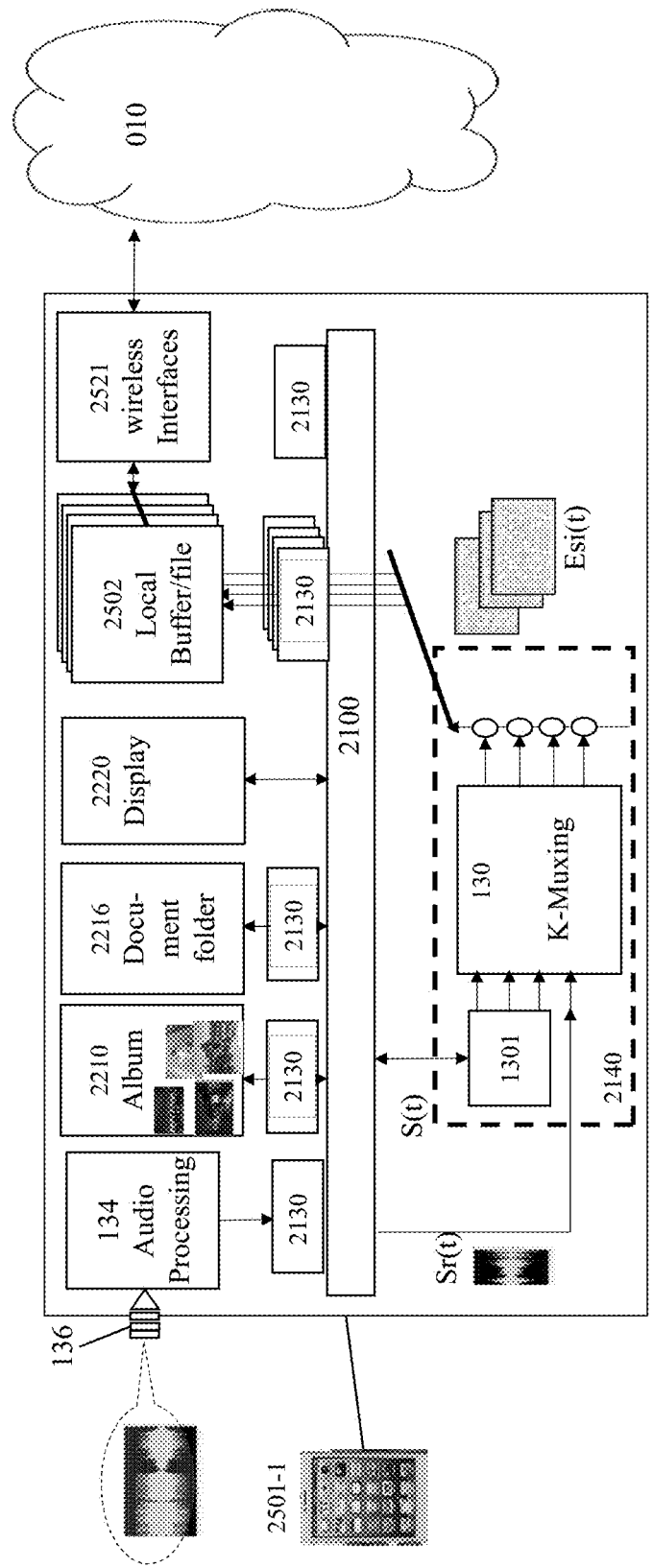
FIG. 14E depicts another different functional flow diagram with 4-to-4 K-Muxing of mobile voice messages and/or recorded audios to be stored on cloud in accordance of some embodiments of this invention.

FIG. 14E shows a software functional block diagram in a mobile device with a function of 4-to-4 K-muxing 130 on a voice data file for storage over distributed cloud storage with privacy without redundancy. The mobile device may be a smart phone 2501-1. The major difference from that in FIG. 14D is that only 3 of the 4 K-Muxing 130 will be sent to cloud 010.

An input signal S(t); a voice clip taken by an operation of audio processing 134 in real time through one of the embedded applications 2130 or a stream of digital voice stored in the document folder 2216 is sent to a pre-processor 2140 before being sent for storage on cloud 010 as primary storage sites or backup storages. S(t) shall be sent to the pre-processing application 2140 via an application program interface (API) 2100. 3 from the associated 4 processed data sets Esi where i=1 to 4 are then sent to cloud 010 for storage through the API 2100 and then local buffers 2302. These various local buffers 2502 are individually associated with different software of the embedded applications 2130, including local file synchronization management of cloud storage such as Dropbox, Google drive, iCloud, OneDrive, and others.

The S(t) features a stream of digitized voice. The API 2100, a set of routines, protocols, and tools for building software applications, specifies how software components should interact and APIs are used when programming graphical user interface (GUI) components. A good API makes it easier to develop a program by providing all the building blocks. A programmer then puts the blocks together.

The preprocessing application 2140 comprises of software for segmenting 1301 which functions as a 1-to-3 TDM de-multiplexing or demuxing operation and that for K-Muxing 130 which is implemented by a 4-to-4 Hadamard matrix. The 1-to-3 TDM demuxing 1301 shall convert the data stream S(t) with a 3R samples per second into 3 data sub-streams, each with a flowing rate of a R samples per second. The K-muxing 130 may function in a mode of sample-to-sample operation, or a mode with block to block operation. For illustrations, we shall focus the operation in a mode of sample-to-sample.

These 3 data substreams are then connected to 3 of the 4 inputs of the K-muxing 130 implemented by a 4-to-4 Hadamard matrix. The remaining input port is then connected to a second sound signals Sr(t). Three of the 4 outputs Esi (where i=1 to 4) from the K-muxing 130 are then uploaded to cloud through local buffers 2502 of various cloud storage operators. It is likely the connectivity of a mobile device such as the smart phone 2501-1 to cloud 010 is through wireless interfaces 2521 supporting WiFi links, cell phone band links, and/or others. The mobile device may also be connected to cloud services via Ethernet (not shown) or other wired connectivity or through USB transports when these non-wireless connectivity is available at home in once office, or other public facilities.

The 3 outputs Esi (where i=1, 2, and 4 as an example) are the K-Muxed files. Individually, each is a weighted sum of all 4 inputs (3 segmented files S1, S2, and S3 from the first voice signal S(t) and the second voice Sr(t) known to a first group of users), featuring un-intelligible noises comprising of aggregated voices of S1(t), S2(t), S3(t) and Sr(t).

For retrieving the original voice stream from the stored data files on cloud for the first group of users, an operation corresponding K-demuxing is not shown. A user must have the access of the known digital voice file Sr(t), and all 3 cloud-stored K-muxed files, Esi and i=1, 2, and 4, to reconstruct S(t) in a retrieving device of the use. There is no redundancy in cloud storages as far as reproducing the original voice stream is concerned.

Figure 15:
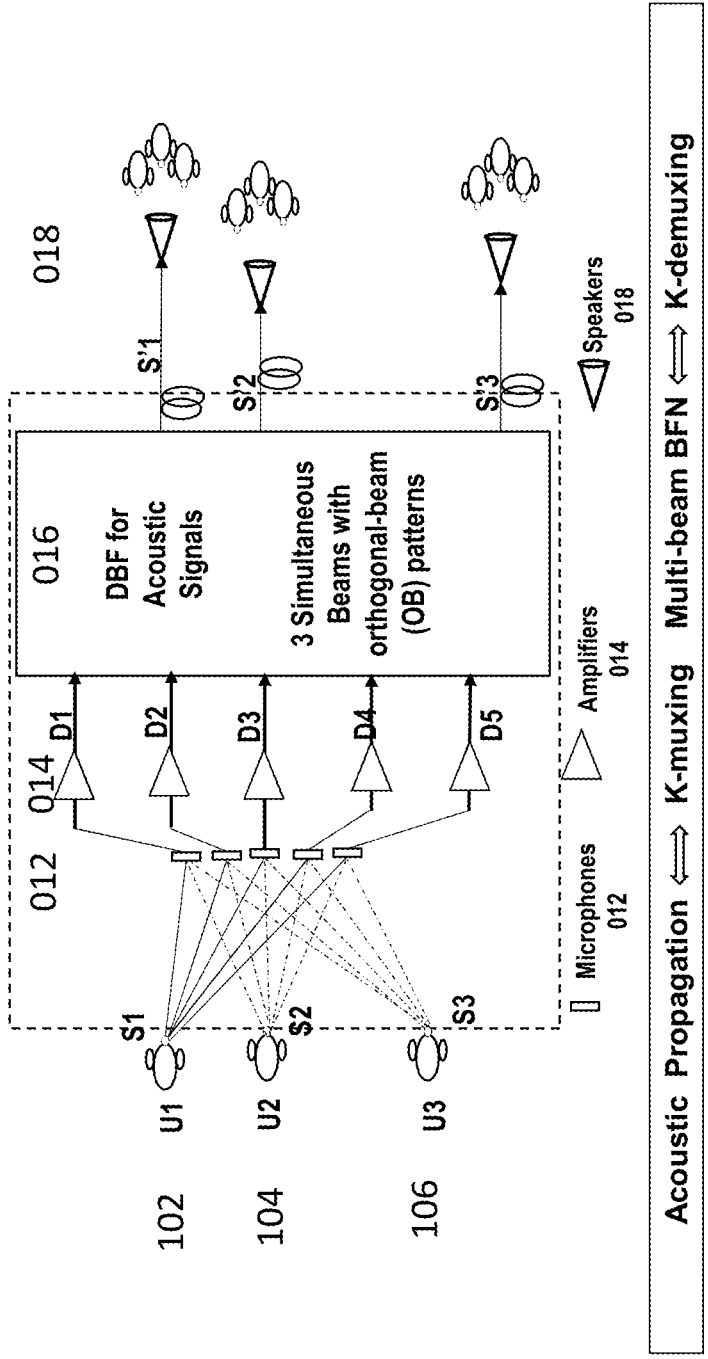
FIG. 15 depicts a block diagram of acoustic recording for three singers; an analogy for Wavefront Multiplexing/De-multiplexing (K-muxing/demuxing) in accordance of some embodiments of this invention.

FIG. 15 is originated from FIG. 4C of the US patent application publication No. 20140081989, "Wavefront Muxing and Demuxing for Cloud Data Storage and Transport," published on Mar. 20, 2014. As analogue to WF muxing or K-Muxing techniques in acoustic, the methods of recording and storing would be different. There are three vocalists, U1 102, U2 104, and U3 106, singing three different songs concurrently, as depicted in FIG. 14. Then, we would use five different microphones in a microphone array 012, each of which links to a corresponding one of amplifiers D1, D2, D3, D4 and D5, to receive the audio data sets S1-S3, spatially aggregated, from the three singers U1 102, U2 104 and U3 106, i.e. sound sources. In addition, there is a digital beam forming (DNF) network which is capable to dynamically equalize phase delays and amplitude offsets of the all 5 amplifiers and form three concurrent acoustic beams with orthogonal beam (OB) receiving patterns. The equalizations are continuously performed among 5 propagation path from a microphone via an amplifier to a input port of the DBF network. A first receiving beam with a first OB receiving pattern features a sensitivity peak toward the first singer U1 102, and concurrently a first sensitivity null toward the second singer U2 104, and a second sensitivity null toward the third singer U3 106. Similarly, a second beam with a $2^{nd}$ OB receiving pattern features a sensitivity peak toward the second singer U2 104, and concurrently a first sensitivity null toward the third singer U3 106, and a second sensitivity null toward the first singer U1 102. A third beam with a $3^{rd}$ OB receiving pattern features a sensitivity peak toward the third singer U3 106, and concurrently a first sensitivity null toward the $1^{st}$ singer U1 102, and a second sensitivity null toward the $2^{nd}$ singer U2 104.

The aggregated audio data sets may sound simply as "noise". The three vocalists 102, 104 and 106, in this example, stand in a first line with about one meter between U1 102 and U2 104, and about two meters between U2 104 and U3 106. The array of five microphones 012, facing the vocalists, are placed in a second line, which is about three meters away from the first line. The spacing between adjacent microphones is approximately 1/10 of a meter or 10 cm. When recording concurrently, each of the 5 microphones 012 picks up or receives voices from all three vocalists U1 102, U2 104, and U3 106.

Referring to FIG. 15, because locations of the five microphones 012 and the three vocalists 102, 104 and 106, an audio stream S1, S2 or S3 from any of the singers, 102, 104 or 106 arrives at the array of five microphones 012 with a particular patterns or distribution of time delays. A "wavefront" or WF is thus formed by the acoustic wave propagation with the pattern of time delays in a particular. Consequently, with respect to one of the vocalists 102, 104, and 106, the array of five microphones 012 "spatially" sample and record a unique wavefront of acoustic waves S1, S2 or S3 propagated from said one of the vocalists 102, 104, and 106. The three unique acoustic wavefronts associated with the voice source S1-S3 originated distinctively from the vocalists 102, 104 and 106 are aggregated by audio propagation in free space, spatially sampled by the array of five microphones 012 into five sampled data sets D1-D5 to be amplified by five amplifiers 014 in five respective receiving channels. The acoustic data sets S1-S3 are spatially aggregated and "captured" via the array of 5 microphones 012 and then amplified by a bank of 5 amplifiers. As a result of spatially sampling in the 5 receiving channels, 3 wavefronts of the aggregation from three acoustic sources S1-S3 are "recorded" concurrently on signals D1, D2, D3, D4, and D5 among the 5 receiving channels. The above aggregation process may be considered as "wavefront multiplexing or WFM", and the aggregated acoustic data sets D1-D5 may be considered as WF "muxed" audio data.

For the DBF network 016, it features 5 inputs and 3 outputs, and performs two functions equalization among multiple input channels and beam-form for multiple concurrent beams. The equalizations are continuously performed among 5 propagation path from a microphone via an amplifier to a input port of the 5-to-3 DBF network.

A first receiving beam with a first OB receiving pattern features a sensitivity peak toward the first singer U1 102, and concurrently a first sensitivity null toward the second singer U2 104, and a second sensitivity null toward the third singer U3 106. Similarly, a second beam with a $2^{nd}$ OB receiving pattern features a sensitivity peak toward the second singer U2 104, and concurrently a first sensitivity null toward the third singer U3 106, and a second sensitivity null toward the first singer U1 102. A third beam with a $3^{rd}$ OB receiving pattern features a sensitivity peak toward the third singer U3 106, and concurrently a first sensitivity null toward the $1^{st}$ singer U1 102, and a second sensitivity null toward the $2^{nd}$ singer U2 104.

Ideally, the first beam shall feature an output with S1 signal only which is originate from U1 102. This is because the OB beam-shaping process in the DBF 016 shall result in an optimized pattern with completely null-out sensitivity (no response at all) at the direction of the second and that of the third voices S2 and S3 originated from U2 104 and U3 106, respectively, while maximizing the sensitivity to the direction of the first signal S1. Similarly, the second OB beam recovers the S2 signals, while the $3^{rd}$ OB beam reconstituting the S3 signals. The 3 OB beams perform the WF demuxing functions, recovering S1, S2, S3 from received signals in the 5 received channels, D1, D2, D3, D4, and D5.

In short, the propagation from three concurrent acoustic signals from the 3 singers to the array of 5 microphones causes the mixing of the signals; effectively does the wavefront multiplexing or K-muxing. The muxed signals are spatially sampled by the array of 5 microphones and captured by 5 microphones 012 of the receiving channels continuously in time. Wavefronts associated with individual acoustic sources are implicitly but uniquely established among signals, D1 to D5 propagating in multiple receiving channels including associated amplifiers 014. The multi-beam DBF 016 performs equivalently the WF demuxing function, recovering the original signals from multiple channels of the K-muxed signals.

Figure 16A:
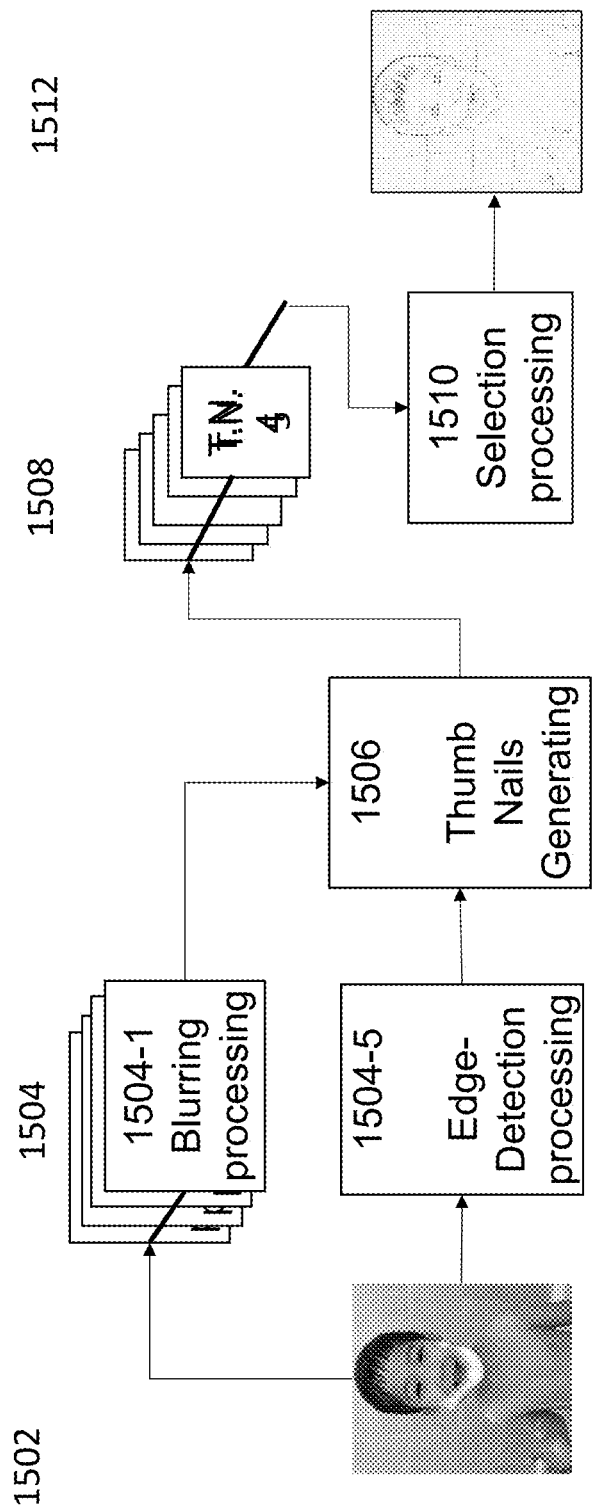
FIG. 16A depicts a simplified block diagram of a method of generating thumbnails and selecting one for a photo, a scanned document, an image or a video clip on smart phones or mobile devices in accordance of some embodiments of this invention.
Figure 16B:
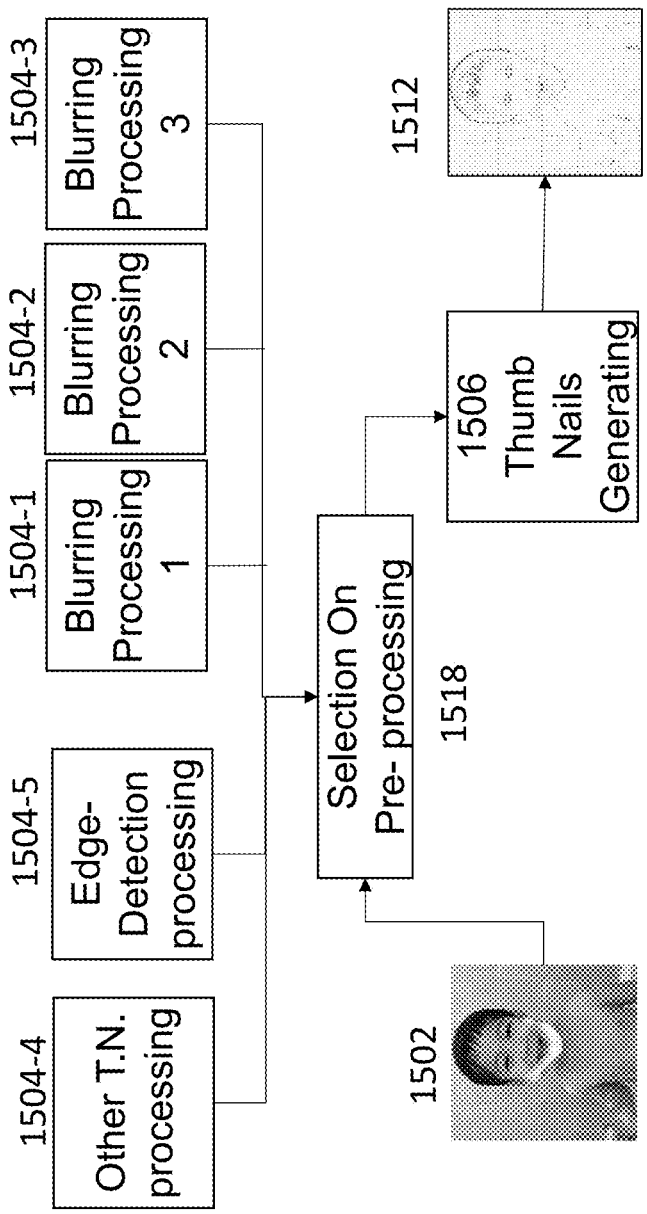
FIG. 16B depicts a simplified block diagram of a second method of creating a thumbnail for a photo, a scanned document, an image or a video clip on smart phones or mobile devices in accordance of some embodiments of this invention.

FIG. 16A and FIG. 16B depicts two techniques for generating thumb-nails (T.N.) in a mobile device such as in a smart phone. A thumbnail shall provide adequate information for a user to identify a stored file uniquely from many stored files without disclosing too much information so that the original user may (quickly) associate the displayed thumbnail to the stored document, while other unintended users shall be excluded from that quick association. The selection shall be personal. We provide multiple choices for users to choose.

FIG. 16A displays a photo 1502 with a boy with shaving cream, which will be stored locally or on cloud. We provide multiple thumbnail options; each to keep only a few essentials on a potential thumb-nails. Many options may be blurred versions 1504-1 of the picture 1502, through processing of edge-detection 1504-5, or via other technique. All the selected processing will go through a processor of thumbnail generating 1506. As depicted, 5 small thumbnails (T.N.) 1508 are generated displayed for the user to select a final version 1512 via a selection processing 1510.

FIG. 16B displays a same photo 1502 with a boy with shaving cream as that in FIG. 15A, which will be stored locally or on cloud. We provide multiple methods of generating thumbnails to keep only a few essentials on potential thumb-nails. However, actual thumbnails will not be provided. Various methods for generating different thumbnails 1504-1 to 1504-5 are presented. Many options may be various blurred versions 1504-1 to 1504-3 of the picture 1502, through processing of edge-detection 1504-5, or via other technique 1504-4. As depicted, 5 methods of generating small thumbnails (T.N.) are displayed for the user to select a final version 1512 via a selection processing 1518. Only the selected processing will go through a processor of thumbnail generating 1506.

What is claimed is:

1. An apparatus comprising:
a pre-processor to convert a source stream in a digital mobile device to N output streams using an N-to-N K-muxing operation, where N is a positive integer and N>2; and
a first local buffer to store at least one of the N output streams, the first local buffer being associated with a first embedded application having local file synchronization management of a first cloud storage,
wherein the at least one of the N output streams is uploaded to the first cloud storage from the first local buffer using the first embedded application.

2. The apparatus of claim 1, wherein the pre-processor comprises:
a segmenter to segment the source stream into M input streams, where M is a positive integer and $2 \le M \le N$; and
an N-to-N K-muxing processor having N input ports and N output ports to transform the M input streams into the N output streams using an N-to-N matrix.

3. The apparatus of claim 1, wherein the digital mobile device is a smart phone or a tablet or a relocatable notebook.

4. The apparatus of claim 1, wherein the source stream includes a set of input data of scanned documents comprising a set of PDF documents converted from digital images by applications embedded in the digital mobile device.

5. The apparatus of claim 1, wherein the source stream includes a set of input data of scanned documents including PDF documents stored in the digital mobile device.

6. The apparatus of claim 2, wherein when M<N, at least one of (N-M) inputs to the N-to-N K-muxing processor is not one of the M streams segmented from the source stream and is a known digital file.

7. The apparatus of claim 1, wherein the source stream is a digital video stream.

8. The apparatus of claim 1, wherein the local file synchronization management is a file hosting service for cloud storage.

9. The apparatus of claim 2, wherein the N-to-N K-muxing processor has one of the N input ports grounded.

10. The apparatus of claim 2, wherein the N-to-N K-muxing processor performs an operation of orthogonal matrix transforms.

11. The apparatus of claim 2, wherein the N-to-N K-muxing processor performs an operation of Hadamard transforms.

12. The apparatus of claim 2, wherein the N-to-N K-muxing processor performs an operation of Fourier transforms.

13. The apparatus of claim 2, wherein the N-to-N K-muxing processor performs an operation of non-orthogonal matrix transforms.

14. An apparatus comprising:
a first local buffer to store at least one of N input streams, the first local buffer being associated with a first embedded application having local file synchronization management of a first cloud storage; and
a post processor in a digital device to convert the N input streams including the at least one of the N input streams to a source stream using an N-to-N K-demuxing operation, where N is a positive integer and N>2,
wherein the at least one of the N input streams is downloaded from the first cloud storage to the first local buffer using the first embedded application.

15. The apparatus of claim 14, wherein the post-processor comprises:
an N-to-N K-demuxing processor to transform the N input streams into the N output streams using an N-to-N matrix; and
a de-segmenter to de-segment M of the N output streams to generate the source stream, where M is a positive integer and $2 \le M \le N$.

16. The apparatus of claim 14, wherein the digital device is a mobile personal device or a mobile phone or a tablet or a smart phone.

17. The apparatus of claim 14, wherein the source stream includes a set of scanned documents.

18. The apparatus of claim 15, wherein when M<N, at least one of (N-M) outputs of the N-to-N K-demuxing processor is not used.

19. The apparatus of claim 14, wherein the source stream is a digital video stream.

20. The apparatus of claim 15, wherein the N-to-N matrix is a Hadamard matrix.

* * * * *